US011293557B2

(12) United States Patent
Warashina et al.

(10) Patent No.: US 11,293,557 B2
(45) Date of Patent: Apr. 5, 2022

(54) SOLENOID VALVE

(71) Applicant: HAMANAKODENSO CO., LTD., Kosai (JP)

(72) Inventors: Tomoaki Warashina, Kosai (JP); Takao Ishida, Kosai (JP)

(73) Assignee: HAMANAKODENSO CO., LTD., Kosai (JP)

( * ) Notice: Subject to any disclaimer, the term of this patent is extended or adjusted under 35 U.S.C. 154(b) by 175 days.

(21) Appl. No.: 16/680,751

(22) Filed: Nov. 12, 2019

(65) Prior Publication Data
US 2020/0158249 A1 May 21, 2020

(30) Foreign Application Priority Data

Nov. 15, 2018 (JP) .............................. JP2018-214810
Nov. 15, 2018 (JP) .............................. JP2018-214811

(51) Int. Cl.
*F16K 31/04* (2006.01)
*F16K 11/04* (2006.01)
*F16K 27/02* (2006.01)
*F16K 31/06* (2006.01)
*F16K 11/074* (2006.01)

(52) U.S. Cl.
CPC ............ *F16K 11/074* (2013.01); *F16K 11/04* (2013.01); *F16K 27/029* (2013.01); *F16K 31/046* (2013.01); *F16K 31/0624* (2013.01)

(58) Field of Classification Search
CPC ........... Y10T 137/87217; F16K 11/048; F16K 27/029; F16K 31/0624; F16K 31/0655; B29C 45/0025; B29C 45/2708; B29C 2045/0027; B29L 2031/7506

USPC .................................................... 251/129.16
See application file for complete search history.

(56) References Cited

U.S. PATENT DOCUMENTS

| 3,529,806 A * | 9/1970 | Kozel ................. F16K 31/0651 251/129.21 |
| 3,559,249 A * | 2/1971 | Patton ................. B29C 45/2708 425/567 |
| 4,313,590 A * | 2/1982 | Nishimiya .......... F16K 31/0655 251/129.08 |
| 4,621,788 A * | 11/1986 | DeLew ............... F16K 31/0651 251/120 |

(Continued)

FOREIGN PATENT DOCUMENTS

JP 2017-082917 A 5/2017

*Primary Examiner* — Seth W. Mackay-Smith
(74) *Attorney, Agent, or Firm* — Harness, Dickey & Pierce, P.L.C.

(57) ABSTRACT

A solenoid valve includes a housing, a valve element provided in the housing to open and close a valve port, and a resin-molded guide member that includes a support portion supporting the valve element to be slidable in an axial direction, and an attachment portion attached to and in contact with an inner side of the housing. The guide member further includes an intermediate joint portion connecting the attachment portion and the support portion. The attachment portion is larger in shape in an orthogonal direction orthogonal to the axial direction than the intermediate joint portion. The support portion extends in the axial direction from the intermediate joint portion. The guide member has an injection-molding gate mark on an outer face of the attachment portion.

11 Claims, 10 Drawing Sheets

(56) References Cited

U.S. PATENT DOCUMENTS

| | | | | |
|---|---|---|---|---|
| 5,759,647 | A | * | 6/1998 | Kuroda ............... B29C 45/2708 |
| | | | | 428/34.5 |
| 5,897,098 | A | * | 4/1999 | Nishinosono ....... F16K 31/0624 |
| | | | | 251/129.08 |
| 6,634,649 | B1 | * | 10/2003 | Yamaguchi ......... B29C 45/0025 |
| | | | | 277/634 |
| 7,073,770 | B2 | * | 7/2006 | Uryu ................... F16K 31/0637 |
| | | | | 137/596.17 |
| 9,945,493 | B2 | * | 4/2018 | Warashina .......... F16H 61/0251 |
| 10,443,756 | B2 | * | 10/2019 | Peterson ............... F16K 11/048 |
| 2017/0122455 | A1 | | 5/2017 | Warashina et al. |
| 2018/0195635 | A1 | | 7/2018 | Warashina et al. |
| 2018/0266583 | A1 | * | 9/2018 | Peterson ........... F16K 31/52416 |

* cited by examiner

SOLENOID VALVE

CROSS REFERENCE TO RELATED APPLICATIONS

The present application claims the benefit of priority from Japanese Patent Application No. 2018-214810 filed on Nov. 15, 2018, and Japanese Patent Application No. 2018-214811 filed on Nov. 15, 2018. The entire disclosures of the above applications are incorporated herein by reference.

TECHNICAL FIELD

The present disclosure relates to a solenoid valve switching flow paths for working fluid.

BACKGROUND

A solenoid valve includes a valve element that is provided in a valve chamber and opens and closes a valve port to switch between an open state and a closed state, and a guide member that is provided in the valve chamber and supports the valve element to be slidable in an axial direction. The guide member is supported to be in contact with an inner side of a housing of the solenoid valve.

SUMMARY

According to one aspect of the present disclosure, a solenoid valve includes: a housing having therein a valve chamber into which working fluid flows; a valve element slidable in the valve chamber to open and close a valve port for switching between an open state allowing a flow of the working fluid from the valve chamber to a downstream passage and a closed state preventing the flow of the working fluid from the valve chamber to the downstream passage; and a guide member being a resin molded article provided in the valve chamber and including a support portion supporting the valve element to be slidable in an axial direction, and an attachment portion attached to and in contact with an inner side of the housing. The guide member has an injection-molding gate mark on the attachment portion.

DETAILED DESCRIPTION

Figure 1:
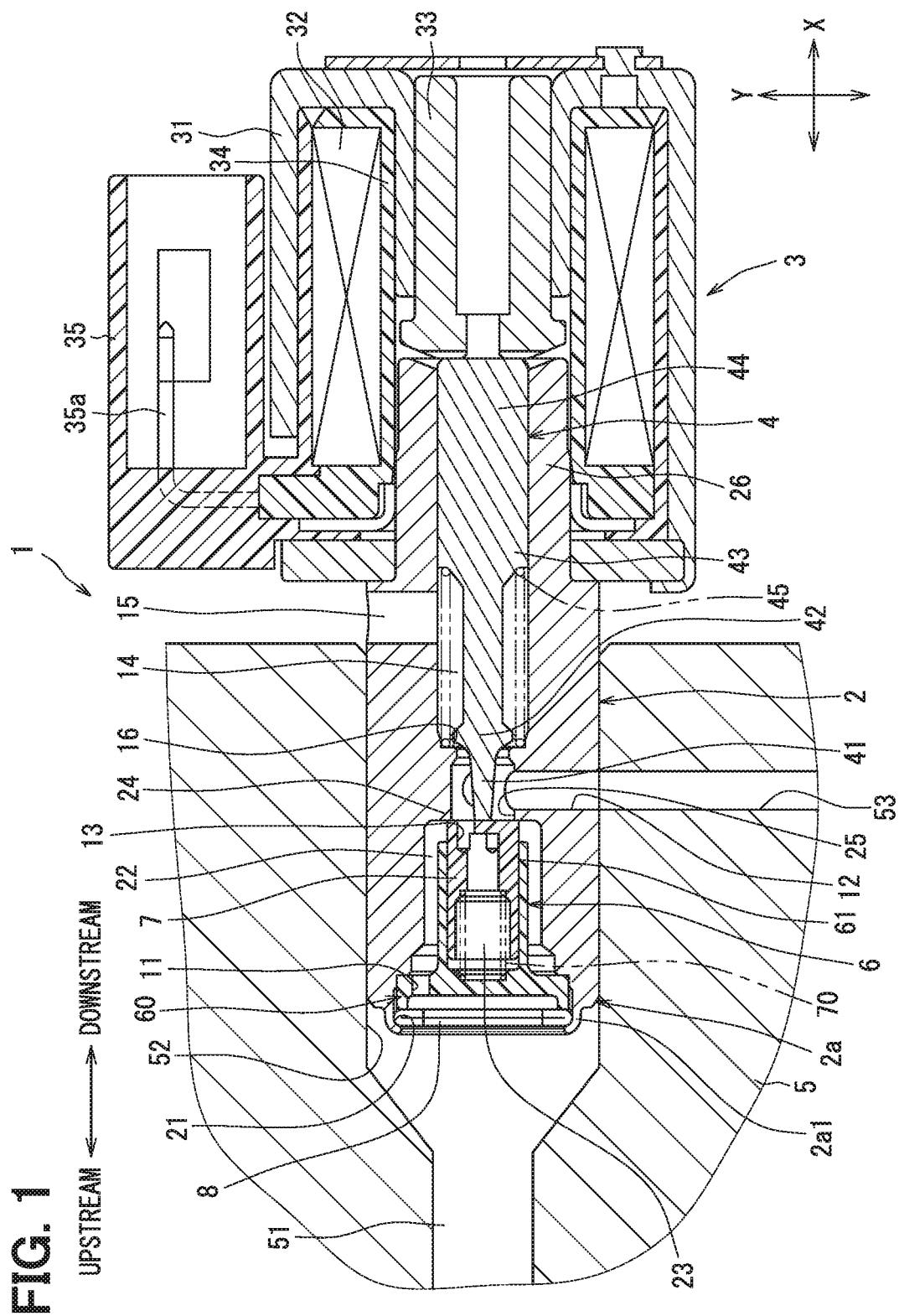
FIG. 1 is a sectional view of a solenoid valve according to a first embodiment.

A solenoid valve of the comparative example includes a valve element that is provided in a valve chamber and opens and closes a valve port to switch between an open state and a closed state, and a guide member that is provided in the valve chamber and supports the valve element to be slidable in an axial direction. The guide member is supported to be in contact with an inner side of a housing of the solenoid valve.

In the solenoid valve in the comparative example, a pressure acting in the valve chamber in the closed state, for example, acts on a sliding part between a cylindrical support portion of the guide member and a cylinder wall portion of the valve element. A dimensional accuracy of the support portion may be required In order to allow smooth sliding of the cylinder wall portion with respect to the support portion while maintaining the pressure in the valve chamber in the closed state. Moreover, the guide member may need to be supported in appropriate position and attitude with respect to the housing, for example.

For use of the guide member that is a resin molded article, resin material may flow smoothly and be spread uniformly in the support portion at the time of molding of the guide member in order to secure the dimensional accuracy of the support portion.

Further, for use of the guide member that is the resin molded article, a position of a gate portion of the guide member through which the resin flows in may be fully considered so that the guide member is supported in the appropriate position and attitude with respect to the housing.

The present disclosure provides a solenoid valve including a guide member having a support portion slidably supporting a valve element, in which resin material can be spread uniformly in the support portion.

The present disclosure provides a solenoid valve securing appropriate positional accuracy and attitude of a guide member that is a resin molded article with respect to a housing.

According to at least one embodiment of the present disclosure, a resin-molded guide member includes a support portion supporting a valve element to be slidable in an axial direction, and an attachment portion attached to and in contact with an inner side of a housing. The guide member further includes an intermediate joint portion connecting the attachment portion and the support portion. The attachment portion has a larger shape in an orthogonal direction orthogonal to the axial direction than the intermediate joint portion. The support portion has a shape extending in the axial direction from the intermediate joint portion. The guide member has an injection-molding gate mark on an outer face of the attachment portion.

Accordingly, at a molding step of the guide member, molten resin flows into a mold from the injection-molding gate mark on the outer face of the attachment portion, smoothly flows inward from the attachment portion to the intermediate joint portion, and branches off from the intermediate joint portion into the support portion. In this way, it is possible to cause the molten resin to flow into the support portion later than into the other portions. Therefore, the resin can be spread to the support portion of the guide member that constitutes a sliding part sliding on the valve element. As a result, resin material can be spread uniformly in the support portion.

According to at least one embodiment of the present disclosure, a resin-molded guide member includes a support portion supporting a valve element to be slidable in an axial direction, and an attachment portion attached to and in contact with an inner side of a housing. The attachment portion includes a fitted portion that is in contact with and fitted in an inner face of the housing, and a non-fitted portion having an outer face separated by a clearance from the inner face of the housing. The guide member has an injection-molding gate mark exposed to the clearance on the outer face of the non-fitted portion.

Accordingly, because the fitted portion of the attachment portion of the guide member is in contact with the housing, the guide member can be positioned appropriately and fixed in an appropriate attitude with respect to the housing. Moreover, the injection-molding gate mark provided on the outer face of the non-fitted portion is housed in the clearance formed between the outer face of the non-fitted portion of the attachment portion and the inner face of the housing. Therefore, the mark of a gate portion formed on the resin molded article does not obstruct mounting of the guide member to the housing. As a result, the appropriate positional accuracy and attitude of the guide member with respect to the housing can be secured.

According to at least one embodiment of the present disclosure, a resin-molded guide member includes a support portion supporting a valve element to be slidable in an axial direction, and a cylindrical attachment portion attached to and in contact with an inner side of a housing. The guide member has an injection-molding gate mark on an inner peripheral face of the cylindrical attachment portion.

Accordingly, because the cylindrical attachment portion is attached to and in contact with the inner side of the housing, the guide member can be positioned appropriately and mounted in the appropriate attitude with respect to the housing. Furthermore, the injection-molding gate mark of the guide member is provided on an inner peripheral face of the cylindrical attachment portion. In this way, the mark of the gate portion formed on the resin molded article does not obstruct mounting of the guide member to the housing. Therefore, the appropriate positional accuracy and attitude of the guide member with respect to the housing can be secured.

Multiple embodiments for carrying out the present disclosure will be described below with reference to the drawings. In each of the embodiments, parts corresponding to matters described in preceding embodiments may be provided with the same reference signs and may not be described repeatedly. If only a part of a structure is described in each of the embodiments, parts described in the preceding embodiments can be applied to the other parts of the structure. Besides combinations of parts which are specifically and clearly described as feasible in each of the embodiments, combinations of parts of the embodiments which are not clearly described as feasible are possible, if the parts can be combined without any special trouble.

First Embodiment

A solenoid valve 1 in the first embodiment will be described with reference to FIGS. 1 to 5. FIG. 1 shows an overall schematic structure of the solenoid valve 1 that is mounted to an automatic transmission system of an automobile, for example, and switches between oil paths in order to carry out transmission control. As shown in FIG. 1, the solenoid valve 1 includes a flow path controller housed in a housing 2 and an electromagnetic solenoid portion 3 integrally connected to the flow path controller.

The flow path controller includes the cylindrical housing 2 that has an end cylinder portion 2a fitted in a mounting hole 52 and extends in an axial direction of the mounting hole 52, the mounting hole 52 forming a circular columnar passage in an automatic transmission or a passage forming member 5 on a side of the automatic transmission. The axial direction in the present description corresponds to a direction along a central axis of a guide member. An upstream passage 51 as an oil inflow passage through which pressure-regulated oil (as an example of working fluid) flows is formed in the passage forming member 5 and the upstream passage 51 communicates with inlet passages 11. The inlet passages 11 are passages that allow the upstream passage 51 and a valve chamber 22 to communicate with each other.

Figure 2:
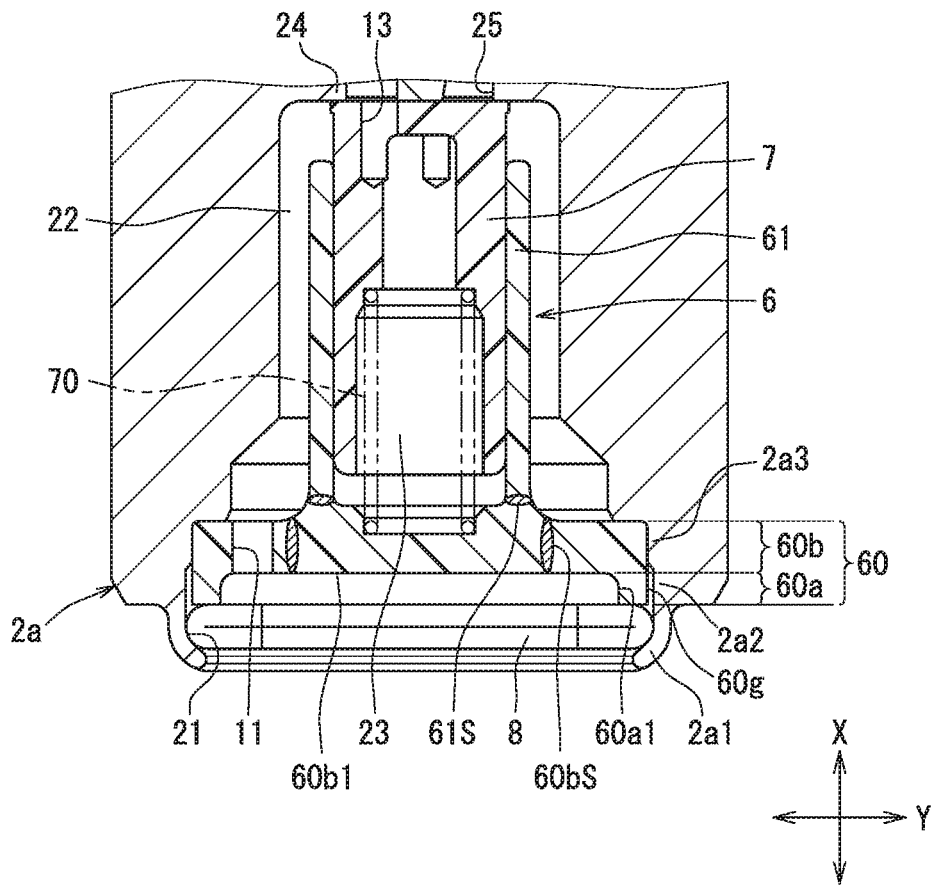
FIG. 2 is a partial sectional view of a guide member of the solenoid valve in the first embodiment.

The housing 2 has the end cylinder portion 2a that is fitted in the mounting hole 52 and a shaft retaining portion 26 that is positioned on an opposite side from the end cylinder portion 2a in the axial direction. As shown in FIG. 2, the end cylinder portion 2a has a tip end portion 2a1 in which an opening end is formed and a first peripheral portion 2a2 and a second peripheral portion 2a3 that surround an attachment portion 60 of a guide member 6. The first peripheral portion 2a2 is positioned closer to the tip end portion 2a1 than the second peripheral portion 2a3. The first peripheral portion 2a2 is a cylindrical portion having a larger inside diameter than the second peripheral portion 2a3.

The shaft retaining portion 26 retains a shaft 4, such that the shaft 4 can be displaced in the axial direction, and is mounted to the electromagnetic solenoid portion 3 that is fitted onto the shaft retaining portion 26. The solenoid valve 1 is mounted to the automatic transmission by being fixed with the end cylinder portion 2a of the housing 2 fitted in the mounting hole 52 in the passage forming member 5 and an outflow port 12 and a downstream passage 53 connected to each other.

In the housing 2, a filter chamber 21 is provided at a position close to a tip end. The filter chamber 21 is a chamber in the solenoid valve 1 into which the oil from the automatic transmission flows first and a filter member 8 that covers an entire cross section of the passage and filters the oil as the working fluid is mounted into the filter chamber 21.

The valve chamber 22 that communicates with downstream sides of the inlet passages 11 is provided in the housing 2 and a valve port 25 is open in a downstream end portion of the valve chamber 22. An inside discharge passage 14 that communicates with an outside discharge passage 15 is provided on a downstream side of the valve port 25 in the housing 2. Furthermore, the outflow port 12 extending sideways to cross the axial direction between the valve port 25 and the inside discharge passage 14 is provided in the housing 2. The outflow port 12 is connected to the downstream passage 53 as an oil outflow passage that is formed in the passage forming member 5 and communicating with a valve of the transmission.

The filter member 8 is a disc-shaped member that is positioned on a most upstream side of a flow of oil in the end cylinder portion 2a. The filter member 8 has a mesh portion disposed at a position facing upstream sides of the inlet passages 11. The filter member 8 has a frame portion provided throughout a circumference in such a manner as to surround a periphery of the mesh portion. For example, the mesh portion is formed by etching a central portion of a disc-shaped plate member. The remaining part of the plate member not subjected to the etching forms the frame portion formed at the periphery of the mesh portion. It is also possible to manufacture the filter member 8 by bonding, welding, or the like of the mesh portion and the frame portion, which are separate members, to each other.

A valve seat 24 with which a downstream end portion of a valve element 7 can come in contact is provided to the housing 2. The valve seat 24 forms a peripheral edge portion of the valve port 25 as a through hole passing through a central portion of the valve chamber 22 in the axial direction. The valve chamber 22 includes a space positioned between the inlet passages 11 and the valve port 25 and houses a support portion 61 of the guide member 6 and the valve element 7. The valve element 7 is moved between an open state and a closed state of the valve port 25 by operation of the solenoid valve 1. The valve element 7 is controlled to come into the open state where the working fluid is allowed to flow from the valve chamber 22 into the downstream passage 53 when the downstream end portion separates from the valve seat 24 and the valve element 7 is controlled to come into the closed state where the working fluid is prevented from flowing when the downstream end portion comes in contact with the valve seat 24.

The valve element 7 is a cylindrical body having a bottom portion positioned at the valve port 25 in the closed state. In the valve element 7, an upstream end portion on an opposite side from the bottom portion is open. A peripheral edge portion of the bottom portion is the downstream end portion. The bottom portion is provided with pressure release passages 13 passing through a portion of the bottom portion excluding a central portion that comes in contact with the shaft 4. The pressure release passages 13 form passages for allowing a spring chamber 23 that is an inner chamber of the cylindrical body, i.e., the valve element 7 and the valve port 25 to communicate with each other in the closed state.

The guide member 6 is housed in the end cylinder portion 2a. The guide member 6 is a resin part integrally including the support portion 61 that supports the valve element 7 in such a manner as to allow the valve element 7 to slide in the axial direction and the attachment portion 60 protruding radially outward in a radial shape at an end portion on an upstream side of the support portion 61. The guide member 6 is a resin molded article that is molded by filling resin material into a mold device. The support portion 61 is a cylindrical portion extending coaxially with the attachment portion 60 from the attachment portion 60 toward the valve port 25 along the axial direction.

The attachment portion 60 is a fixed portion that has an outer peripheral portion coming in contact with the end cylinder portion 2a from inside and is fixed to the end cylinder portion 2a by partial swaging of an inner wall of the end cylinder portion 2a. Therefore, a plurality of swaged portions for fixing the attachment portion 60 to the housing 2 is provided to the inner wall of the end cylinder portion 2a. The single or plurality of inlet passage(s) 11 passes/pass in the axial direction through a portion of the attachment portion 60 closer to a center than the plurality of swaged portions.

As shown in FIG. 2, the attachment portion 60 includes a board-shaped portion 60b integral with an upstream end portion of the support portion 61 and an annular protruding portion 60a protruding in an annular shape along the central axis of the guide member 6 from an outer peripheral edge of an upstream end face 60b1 of the board-shaped portion 60b. An upstream end face 60a1 of the annular protruding portion 60a is positioned on an upstream side of the flow of working fluid with respect to the upstream end face 60b1 of the board-shaped portion 60b. The board-shaped portion 60b and the upstream end face 60b1 are formed to be orthogonal to the central axis of the guide member 6. The upstream end face 60a1 is displaced a distance corresponding to an axial length of the annular protruding portion 60a from the upstream end face 60b1 toward the upstream side. The upstream end face 60a1 is in contact with the filter member 8. The annular protruding portion 60a and the tip end portion 2a1 of the end cylinder portion 2a pinch the filter member 8. The upstream end face 60b1 and the filter member 8 are at a distance corresponding to the axial length of the annular protruding portion 60a from each other in the axial direction.

A central portion of the board-shaped portion 60b forming the upstream end face 60b1 is an intermediate joint portion connecting the attachment portion 60 and the support portion 61. The attachment portion 60 and the intermediate joint portion are provided at about the same positions in the axial direction and arranged in the orthogonal direction orthogonal to the axial direction. The support portion 61 is a cylindrical portion extending in the axial direction from a downstream face of the central portion of the board-shaped portion 60b. The attachment portion 60 has a larger shape in the orthogonal direction orthogonal to the axial direction than the intermediate joint portion connecting the attachment portion 60 and the support portion 61.

Figure 3:
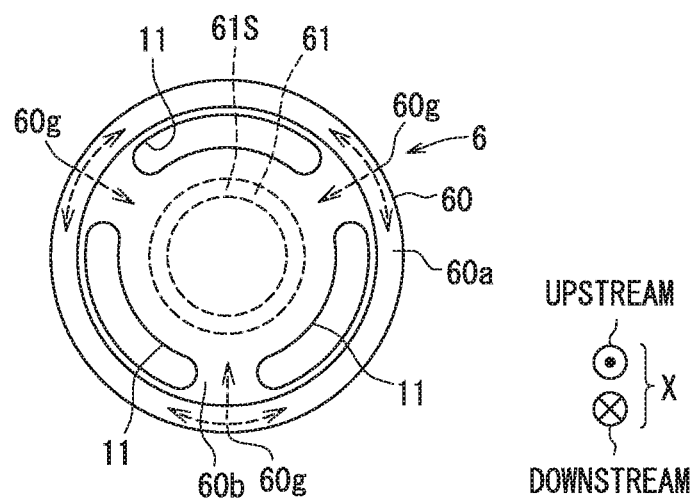
FIG. 3 is a plan view of an attachment portion and inlet passages of the guide member in the first embodiment in an axial direction.

The single or plurality of inlet passage(s) 11 is/are formed to pass through the board-shaped portion 60b in the axial direction. The inlet passage(s) 11 passes/pass through the board-shaped portion 60b on an inner side of the annular protruding portion 60a. As shown in FIG. 3, the plurality of inlet passages 11 are arranged at intervals in a circumferential direction. Resin portions between the adjacent inlet passages 11 are portions of the board-shaped portion 60b and the annular protruding portion 60a and the support portion 61 are connected by the portions. The resin portions between the inlet passages 11 are provided at equal intervals in the circumferential direction. The board-shaped portion 60b has a portion connected to the upstream end portion of the support portion 61 on a radially inner side of the inlet passages 11, i.e., at a position closer to the central axis of the guide member 6 than the inlet passages 11.

As shown in FIGS. 2 and 3, the connection portion where the board-shaped portion 60b and the upstream end portion of the support portion 61 are connected to each other forms an annular face that is a face orthogonal to the central axis of the guide member 6 and has about the same width as a wall thickness of the support portion 61. An area of the annular face is equal to or equivalent as an area of a cross sectional surface 61S of the support portion 61. The cross sectional surface 61S of the support portion 61 is a face orthogonal to the central axis of the guide member 6.

The board-shaped portion 60b has such a structure that a cylindrical sectional surface 60bS closer to an outer peripheral face of the board-shaped portion 60b than the connection portion to the support portion 61 has a larger area than the cross sectional surface 61S. The cylindrical sectional surface 60bS is obtained by cutting the board-shaped portion 60b into a cylindrical shape around the central axis of the guide member 6. The cylindrical sectional surface 60bS is the section of the board-shaped portion 60b positioned on the radially inner side of the inlet passages 11, i.e., closer to the central axis of the guide member 6 than the inlet passages 11 and on a radially outer side of the upstream end portion of the support portion 61. The area of the cylindrical sectional surface 60bS is a value obtained by a product of a circumferential length and an axial length of the cylindrical sectional surface 60bS. The cylindrical sectional surface 60bS can be translated into a section at a position closer to a central axis of the board-shaped portion 60b than the connection portion of the board-shaped portion 60b and the support portion 61.

The cylindrical sectional surface 60bS is a passage of the board-shaped portion 60b in the mold through which molten resin passes at a molding step for manufacturing the guide member 6. The connection portion where the board-shaped portion 60b and the upstream end portion of the support portion 61 are connected to each other is a branch portion from which the molten resin branches off into the support portion 61 from a passage corresponding to the board-shaped portion 60b in the molding step. The cross sectional surface 61S is a passage through which the molten resin passes when branching off into the support portion 61 from the passage corresponding to the board-shaped portion 60b in the mold in the molding step.

The board-shaped portion 60b is provided coaxially with the support portion 61. The board-shaped portion 60b is a fitted portion that is in contact with and fitted in an inner face of the end cylinder portion 2a. The annular protruding portion 60a is a non-fitted portion that forms a clearance between its outer peripheral face and the inner face of the end cylinder portion 2a. The board-shaped portion 60b and the second peripheral portion 2a3 are in contact and fitted with each other throughout a circumference or at portions throughout the circumference. With this structure, the guide member 6 is positioned appropriately and fixed in an appropriate attitude with respect to the housing 2.

The outer peripheral face of the annular protruding portion 60a is separate from the inner face of the first peripheral portion 2a2 of the end cylinder portion 2a, the inner face facing the outer peripheral face in the radial direction. The clearance is formed between the annular protruding portion 60a and the first peripheral portion 2a2. The clearance forms a cylindrical space formed outside the annular protruding portion 60a or inside the first peripheral portion 2a2. In the clearance, an injection-molding gate mark 60g formed on the guide member 6 is exposed. The injection-molding gate mark 60g is provided to the attachment portion 60 to be in a range of a radial length of the clearance. The injection-molding gate mark 60g can be provided in the clearance to partially or entirely face or occupy the clearance.

The injection-molding gate mark 60g may be provided to an outer face of the annular protruding portion 60a. The injection-molding gate mark 60g is a portion left on the guide member 6 as a mark of cutting of a gate portion 101 off from a molding 100 manufactured in molding the guide member 6 by using resin. The injection-molding gate mark 60g may be a protruding portion protruding from the outer face of the non-fitted portion or may be left as a cut mark not protruding from the outer face of the non-fitted portion depending on a method of cutting the gate portion 101 and a cut position. "The outer face of the annular protruding portion 60a" mentioned here can be translated into "the outer peripheral face of the annular protruding portion 60a".

The injection-molding gate mark 60g may be a structure provided to an outer face of the board-shaped portion 60b. If the injection-molding gate mark 60g is this structure, the injection-molding gate mark 60g may not protrude from the outer face of the board-shaped portion 60b. "The outer face of the board-shaped portion 60b" mentioned here can be translated into "the outer peripheral face of the board-shaped portion 60b".

The injection-molding gate mark 60g protrudes from the outer face of the annular protruding portion 60a. The injection-molding gate mark 60g is housed in the cylindrical clearance formed between the outer face of the annular protruding portion 60a and the inner face of the first peripheral portion 2a2. The injection-molding gate mark 60g may be separate from the inner face of the first peripheral portion 2a2 or in contact with the inner face of the first peripheral portion 2a2.

The injection-molding gate mark 60g is provided at a predetermined position throughout the circumference of the outer face of the annular protruding portion 60a. The plurality of injection-molding gate marks 60g may be arranged at intervals throughout the circumference of the outer face of the annular protruding portion 60a. The injection-molding gate mark 60g may be provided throughout the circumference of the outer face of the annular protruding portion 60a. In this structure, the injection-molding gate mark 60g may form an annular protrusion portion extending throughout the entire circumference of the outer face of the annular protruding portion 60a. The annular protrusion portion can be disposed in an area from a tip end portion of the annular protruding portion 60a to an end portion of the annular protruding portion 60a on a side of the board-shaped portion 60b in the axial direction of the guide member 6.

As shown in FIG. 3, the injection-molding gate mark 60g may be provided on a radially outer side of the resin portions between the adjacent inlet passages 11. The guide member 6 may be provided with the plurality of injection-molding gate marks 60g. In this case, in manufacturing the molding 100 including the guide member 6, it is possible to employ a gate method in which resin flows in from a plurality of gates. Circumferential positions of the injection-molding gate marks 60g may be at least positions corresponding to the resin portions between the inlet passages 11. In the molding step, as shown by dotted-line arrows in FIG. 3, the molten resin flowing in from the respective injection-molding gate marks 60g flows toward the central axis of the guide member 6 through between the inlet passages 11 and also flows on an outer side of the inlet passages 11 while dividing in the circumferential direction. In this way, the molten resin flowing in from the injection-molding gate marks 60g can flow from the outer peripheral side toward the central axis to fill the annular protruding portion 60a and the board-shaped portion 60b and then branch off into the support portion 61 to fill the support portion 61.

Figure 4:
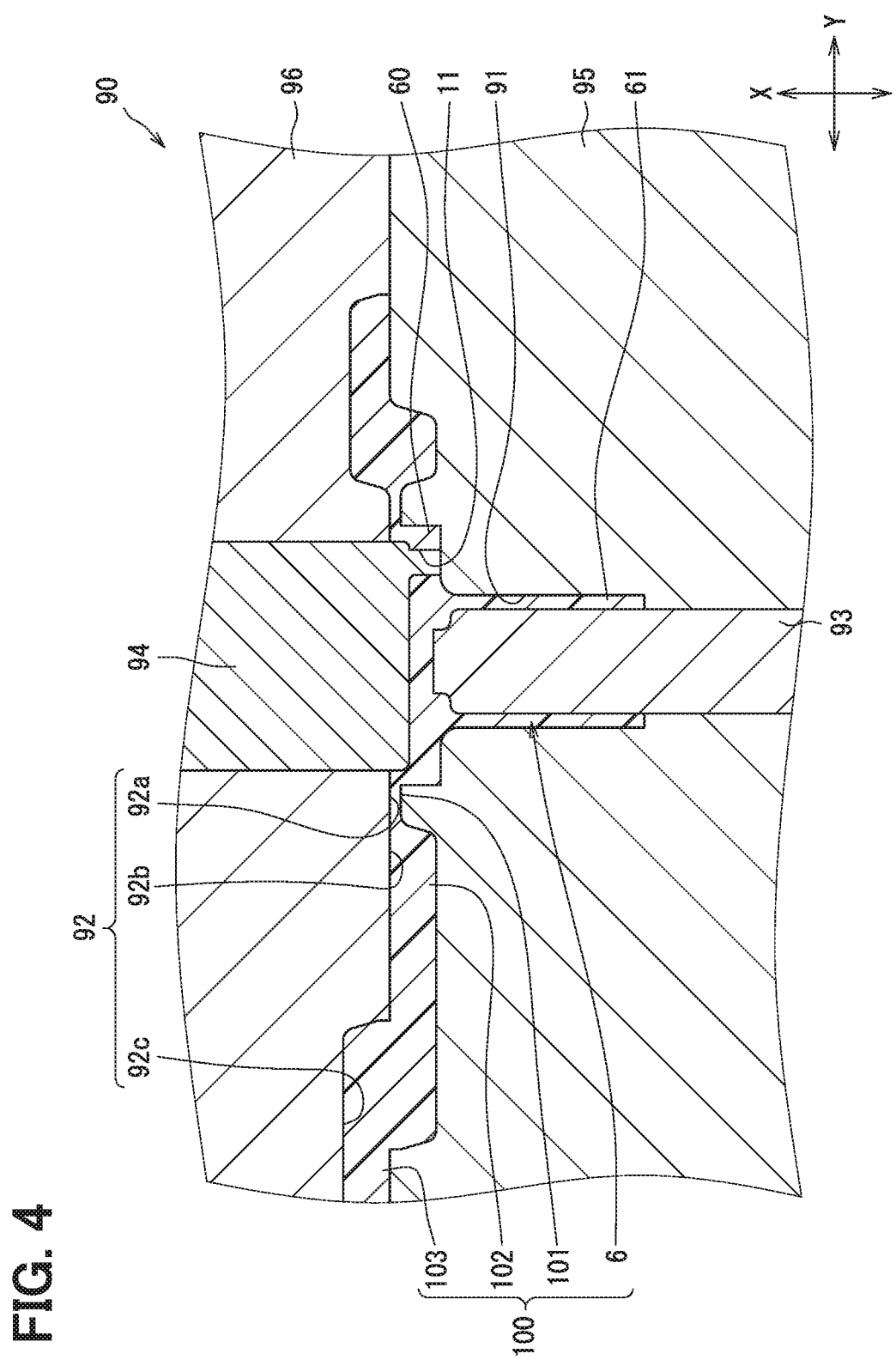
FIG. 4 is a vertical sectional view of a structure of a mold device.

Next, a method for manufacturing the guide member 6 that is a resin molded article will be described. The guide member 6 is molded by using a mold device 90 such as a mold. First, the mold device 90 will be described with reference to FIG. 4. As shown in FIG. 4, a cavity 91 for molding the guide member 6 and a resin passage 92 for supplying molten resin into the cavity 91 are provided in the mold device 90. The cavity 91 forms an inner space having a similar shape to the guide member 6.

The resin passage 92 includes a sprue into which the molten resin is supplied from an injection molding machine, a gate 92a for supplying the molten resin into the cavity 91, and runners 92b, 92c connecting the sprue and the gate 92a. The gate 92a is a film gate. The gate 92a is connected to an outer periphery of the cavity 91 and extends in an annular shape along a circumferential direction of the cavity 91. The gate 92a is disposed at a portion of the cavity 91 corresponding to an outer peripheral face of the attachment portion 60 in a radial direction Y. The first runner 92b is provided on an outer peripheral side of the gate 92a, extends in an annular shape along a circumferential direction of the gate 92a, and is connected to the gate 92a. The second runner 92c connects the first runner 92b and the sprue while extending in the radial direction Y.

The mold device 90 has a first pin-shaped mold portion 93, a second pin-shaped mold portion 94, a first mold portion 95, and a second mold portion 96. In the mold device 90, these mold portions are assembled to form the cavity 91, the gate 92a, and the runners 92b, 92c. For the guide member 6, the first mold portion 95 molds at least the support portion 61 and the second mold portion 96 molds at least a tip end face of the attachment portion 60. The first pin-shaped mold portion 93 is mounted to the first mold portion 95 by being inserted into an insertion hole provided in the first mold portion 95 and molds an inner peripheral face of the support portion 61. The second pin-shaped mold portion 94 is mounted to the second mold portion 96 by being inserted into an insertion hole provided in the second mold portion 96 and molds inner peripheral faces of the inlet passages 11.

To manufacture the guide member 6, the mold device 90 is prepared and then, a step of molding the molding 100 is performed by use of the mold device 90. In this step, the molten resin that is resin material mixed with glass fibers, for example, is injected from the injection molding machine into the sprue of the mold device 90. The molten resin flows through the runner 92c and the runner 92b, flows into the cavity 91 from the gate 92a, reaches a portion of the cavity 91 for molding the attachment portion 60, and reaches a portion of the cavity 91 for molding the support portion 61 by moving in an axial direction X.

Because the gate 92a and the portion of the cavity 91 for molding the attachment portion 60 are arranged in the radial direction Y, a direction in which the molten resin flows in the portion of the cavity 91 for molding the attachment portion 60 is likely to be uniformized into the radial direction Y. In this case, turbulence is less likely to be generated in the molten resin flowing through the portion of the cavity 91 for molding the attachment portion 60. As a result, when the molten resin solidifies to form the attachment portion 60, shrinkage anisotropy of the molten resin is reduced, which makes the attachment portion 60 less likely to bend and become deformed.

Because the gate 92a has the annular shape as described above, the molten resin flowing through the portion of the cavity 91 for molding the support portion 61 is less likely to move in the circumferential direction of the cavity 91 and is likely to move in the axial direction X. In other words, turbulence is less likely to be generated in the molten resin flowing through a portion of the cavity 91 for molding the inner peripheral face and the like of the support portion 61. As a result, when the molten resin solidifies to form the support portion 61, shrinkage anisotropy of the molten resin is reduced, which makes the support portion 61 less likely to bend and become deformed.

Moreover, because the gate 92a is the film gate and therefore has the annular shape, it is unlikely that flows of molten resin in opposite directions meet in the circumferential direction of the cavity 91. As a result, when the molten resin solidifies to mold the support portion 61, a weld that is a meeting portion of the flows of molten resin is less likely to be generated. During the injection of the molten resin into the mold device 90, the first pin-shaped mold portion 93 performs gas release from the cavity 91 in such a manner as to release gas from an opposite side from the gate 92a in the axial direction X of the cavity 91.

Figure 5:
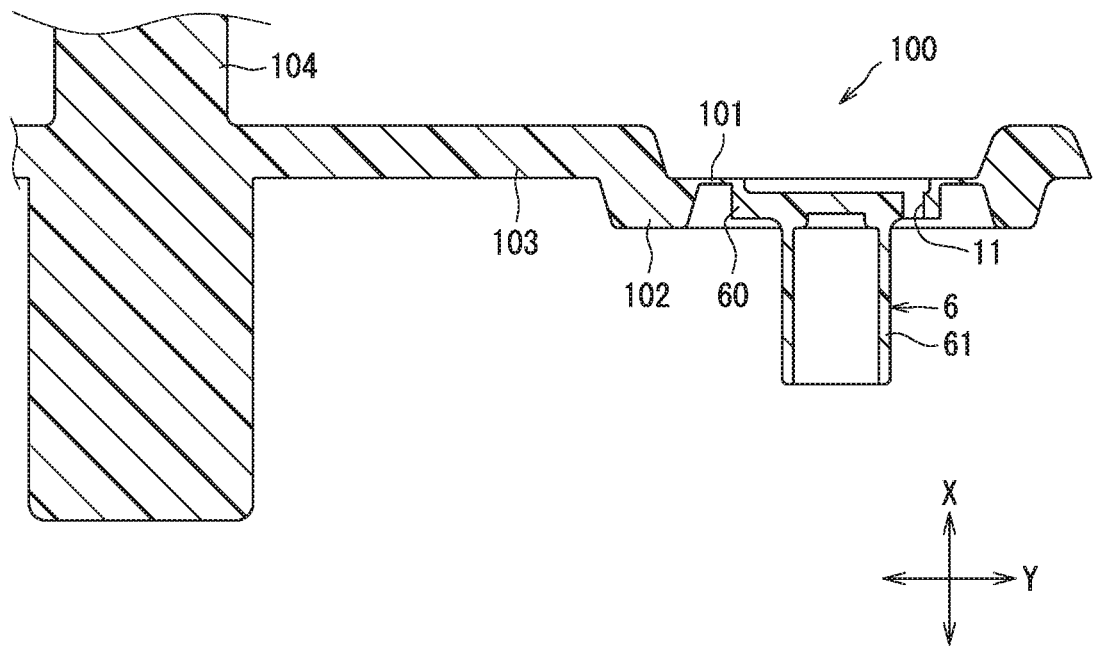
FIG. 5 is a vertical sectional view of a molding.

Next, after solidifying the molten resin, the mold device 90 is detached from the molding 100 that is the solidified molten resin. As shown in FIG. 5, the molding 100 includes the guide member 6, a gate portion 101 molded by the gate 92a, a first runner portion 102 and a second runner portion 103 molded by the runners 92b, 92c, and a sprue portion 104 molded by the sprue, which are integral with each other. The gate portion 101 extends radially outward in a radial shape from the outer peripheral face of the attachment portion 60 and extends in an annular shape in a circumferential direction of the valve element 7. The first runner portion 102 extends radially outward from the gate portion 101 and extending in an annular shape in a circumferential direction of the gate portion 101. In this case, the gate portion 101 is disposed between the guide member 6 and the first runner portion 102 in the radial direction Y of the guide member 6. The second runner portion 103 connects the first runner portion 102 and the sprue portion 104.

Next, for the molding 100, a step of detaching the guide member 6 from the first runner portion 102 is performed. In this step, the gate portion 101 is cut by use of a laser output from a laser irradiation device, for example. The laser irradiation device outputs the laser such that the laser extends in the axial direction X of the guide member 6 and the laser is applied to a position of the gate portion 101 separate radially outward from the attachment portion 60 and separate radially inward from the first runner portion 102. After the gate portion 101 is cut, a portion of the gate portion 101 remaining on the side of the guide member 6 is the injection-molding gate mark 60g.

The filter member 8 is fixed integrally with the attachment portion 60 of the guide member 6 by the plurality of swaged portions, for example. The plurality of swaged portions are arranged at equal intervals in the circumferential direction at the periphery of the mesh portion. The plurality of swaged portions are provided to the tip end portion 2a1 of the end cylinder portion 2a. Alternatively, the plurality of swaged portions may be a plurality of protruding portions protruding from an end face of the attachment portion 60 in contact with the frame portion, arranged in the circumferential direction, and deformed by swaging. In this case, the filter member 8 and the attachment portion 60 are integrated with each other, with the plurality of protruding portions passing through hole portions formed in the frame portion, and disposed inside the end cylinder portion 2a. The attachment portion 60 has the plurality of swaged portions arranged at the intervals around the central axis of the guide member 6.

The support portion 61 of the guide member 6 supports a cylinder wall portion of the valve element 7 coaxial with the support portion 61 and in contact with the support portion 61 from inside. The cylindrical valve element 7 can slide in the axial direction with respect to the support portion 61 while an inner wall face of the support portion 61 and the outer wall face of the cylinder wall portion of the valve element 7 are in contact with each other. Furthermore, the valve element 7 receives a spring force in the axial direction from a spring 70, which is an example of a biasing member, and is pushed toward the valve port 25. The spring 70 is disposed between the central portion of the board-shaped portion 60b and a stepped portion formed on the cylinder wall portion of the valve element 7.

In the open state where the valve element 7 is separate from the valve seat 24, the working fluid after passing through the upstream passage 51 passes through the inlet passages 11 and flows into the valve chamber 22. At this time, a pressure in the valve chamber 22 is increased by an inflow of the working fluid. As a result, a fluid pressure in the valve chamber 22 acts on the valve element 7 and therefore the fluid pressure acts on the spring chamber 23 inside the valve element 7 as well. The pressure acting on the spring chamber 23 acts on a side face of the cylinder wall portion 72 of the valve element in the valve chamber 22 and acts on the spring chamber 23 via a sliding portion sliding on the support portion 61. Therefore, the guide member 6 guides the valve element 7, which receives the spring force of the spring 70, a force applied by the shaft 4, and the fluid pressure, in reciprocating in the axial direction. Because the valve element 7 has the pressure release passages 13 passing through a bottom portion 71, the pressure acting on the spring chamber 23, i.e., the inside chamber of the cylindrical body is released to the downstream passage 53 via the pressure release passages 13, which suppresses the internal pressure in the inside chamber of the cylindrical body. In this way, even if a high fluid pressure acts on the valve chamber 22, it is possible to suppress a pressure that the valve element 7 receives in the axial direction.

The valve element 7 is displaced in the axial direction by a pressing force of the shaft 4 caused to operate in the axial direction by the electromagnetic solenoid portion 3 and switched between the closed state where the valve element 7 is seated on the valve seat 24 around the valve port 25 and the open state where the valve element 7 is separate from the valve seat 24. In the closed state, the outflow port 12 and the upstream passage 51 are disconnected from each other and a tapered valve portion 42 of the shaft 4 separates from a periphery of a discharge valve port 16 to open the inside discharge passage 14 to thereby connect the downstream passage 53 and the outside discharge passage 15. In the open state, the outflow port 12 and the upstream passage 51 are connected to each other and the valve portion 42 is seated on the periphery of the discharge valve port 16 to close the inside discharge passage 14 to thereby disconnect the downstream passage 53 and the outside discharge passage 15 from each other.

The electromagnetic solenoid portion 3 disposed on a side of a rear end of the housing 2 includes a yoke 31, a bobbin 34, a coil 32, a movable member 33, a shaft 4, a spring 45, a connector 35, and the like. The bobbin 34 is formed in a substantially circular cylindrical shape by use of resin material and provided in the yoke 31. The coil 32 is wound around an outer peripheral face of the bobbin 34. The yoke 31 is made of magnetic material. The yoke 31 is provided coaxially with the bobbin 34 in such a manner as to support an inner peripheral side of the bobbin 34 and cover an outer peripheral side of the coil 32. The bobbin 34 is provided coaxially with the housing 2 while housing, inside itself, a portion of the housing 2 supporting the shaft 4 such that the shaft 4 can slide. The yoke 31, the movable member 33, the shaft 4, and the like are provided coaxially with the housing 2 similarly to the bobbin 34.

The movable member 33 is formed in a circular cylindrical shape by use of magnetic material. The movable member 33 is supported by the yoke 31 in such a manner as to be able to reciprocate in the axial direction. In the electromagnetic solenoid portion 3, a magnetic circuit is formed by the movable member 33 and the yoke 31.

A large diameter portion 44 of the shaft 4 is fixed to an end face of a bottom portion of the movable member 33 to be coaxial with the movable member 33. The shaft 4 and the movable member 33 can integrally reciprocate in the axial direction. The shaft 4 integrally includes a tip end portion 41 positioned concentrically with the valve port 25 and having a small diameter, the valve portion 42 positioned in the inside discharge passage 14, and the large diameter portion 44 fitted in the shaft retaining portion 26 to be able to slide with a stepped portion 43 interposed therebetween. The inside discharge passage 14 is connected to the outside discharge passage 15 formed on the side of the rear end of the housing 2. The outside discharge passage 15 is a passage forming a drain port and provided to the housing 2 on a tip end side of the shaft retaining portion 26 to extend in an orthogonal direction orthogonal to the inside discharge passage 14.

Between the stepped portion 43 and a peripheral edge of the discharge valve port 16, the spring 45 as an example of a biasing member is disposed. The spring 45 constantly applies a biasing force for pushing the shaft 4 toward the movable member 33. The valve element 7 disposed in the valve chamber 22 is constantly pushed toward the valve port 25 by the spring 70. In this way, when the electromagnetic solenoid portion 3 is not energized, the shaft 4 is biased by the spring force of the spring 45 and the valve element 7 is pushed toward the valve port 25 by the spring force of the spring 70. As a result, the valve portion 42 opens the discharge valve port 16 and a downstream portion of the valve element 7 closes the valve port 25.

The connector 35 is integrally molded with an outer shell of the coil 32 and provided to be positioned beside the yoke 31. The connector 35 is provided to energize the coil 32 and a terminal 35a in the connector 35 is electrically connected to the coil 32. In the electromagnetic solenoid portion 3, it is possible to control a current passing through the coil 32 by electrically connecting the terminal 35a to a current controller or the like by use of the connector 35.

When the coil 32 of the electromagnetic solenoid portion 3 is not energized, the shaft 4 is biased in such a direction as to separate from the valve element 7 by the spring force of the spring 45 and the valve element 7 is pushed toward the valve port 25 by the spring 70. As a result, the valve element 7 closes the valve port 25. Moreover, the valve portion 42 of the shaft 4 opens the discharge valve port 16. In this state, the upstream passage 51 and the downstream passage 53 are disconnected from each other and the oil from the downstream passage 53 passes through the outflow port 12 and the inside discharge passage 14 and is discharged outside from the outside discharge passage 15.

If the coil 32 is energized in this state, a magnetic flux is generated in the magnetic circuit formed by the yoke 31 and the movable member 33 and the movable member 33 is axially attracted toward the tip end side of the housing 2 and moves toward the tip end side against the biasing force of the spring 45 to thereby move the shaft 4. At this time, the valve portion 42 closes the discharge valve port 16 and the valve element 7 is pushed toward the upstream side by the shaft 4 to thereby move toward the tip end side to open the valve port 25. In this state, the upstream passage 51 and the downstream passage 53 are connected to each other and the oil from the upstream passage 51 passes through the inlet passage 11, the valve chamber 22, the valve port 25, and the outflow port 12 and flows into the downstream passage 53. In this manner, by turning on/off the current passing through the coil 32, it is possible to perform an ON/OFF control of a pressure of control fluid in the oil outflow passage. In this way, it is possible to control the pressure, a flow rate, and the like of the control fluid used for controlling an object to be controlled.

Workings and effects of the solenoid valve 1 in the first embodiment will be described below. The solenoid valve 1 includes: the housing 2 having, inside itself, the valve chamber 22; the valve element 7 that is provided in the valve chamber 22 and opens and closes the valve port 25 between the open state and the closed state; the guide member 6 that supports the valve element 7; and the electromagnetic solenoid portion 3 that generates a drive force for displacing the valve element 7 in the axial direction. The guide member 6 is the resin molded article that is provided in the valve chamber 22 and has the support portion 61 and the attachment portion 60 mounted while in contact with the housing 2 from inside, the support portion 61 supporting the valve element 7 such that the valve element 7 can slide in the axial direction of the guide member. The guide member 6 further has the intermediate joint portion connecting the attachment portion 60 and the support portion 61. The attachment portion 60 has the larger shape in the orthogonal direction orthogonal to the axial direction of the guide member 6 than the intermediate joint portion. The support portion 61 has the shape extending in the axial direction of the guide member 6 from the intermediate joint portion. The injection-molding gate mark 60*g* is provided to an outer face of the attachment portion 60.

With this structure, it is possible to cause the molten resin flowing into the mold from the injection-molding gate mark 60*g* on the outer face of the attachment portion 60 to smoothly flow down from the attachment portion 60 to the intermediate joint portion inside and it is possible to form the flow branching off from the intermediate joint portion into the support portion 61 in the molding step. By forming this flow of resin, it is possible to cause the molten resin to flow into the support portion 61 later than into other portions. Therefore, it is possible to provide the guide member 6 including the support portion 61 with high dimensional accuracy required for sliding on the valve element 7. As a result, it is possible to provide the solenoid valve 1 in which the resin material can be spread uniformly in the support portion 61 of the guide member 6.

The guide member 6 has such a structure that the cylindrical sectional surface 60*b*S of the intermediate joint portion closer to the central axis of the guide member 6 or the outer face of the attachment portion 60 than the connection portion between the intermediate joint portion and the support portion 61 has the larger area than the cross sectional surface 61S of the support portion 61. With this structure, in the molding step of the guide member 6, the molten resin flowing in from the position corresponding to the injection-molding gate mark 60*g* flows through the attachment portion 60 and the intermediate joint portion in this order and then branches off from the intermediate joint portion and flows down into the support portion 61. At this time, because the molten resin flows smoothly from the attachment portion 60 into the intermediate joint portion with a small passage resistance, it is possible to form the flow of molten resin that fills the intermediate joint portion first and then fills the support portion 61. In the guide member 6, the resin material can be spread uniformly in the support portion 61, which contributes to enhancement of the dimensional accuracy of the support portion 61.

The injection-molding gate mark 60*g* may be provided at a position of the attachment portion 60 closer to the upstream end face 60*a*1 than to the downstream end face. With this structure, the molten resin flowing in from the gate in the molding step of the guide member 6 can form the flow of resin flowing down toward the intermediate joint portion while widely spreading through the attachment portion 60 from the position of the outer face of the attachment portion 60 close to the upstream end face 60*a*1. In this way, resin filling performance is increased in the attachment portion 60 positioned on the upstream side, which increases the pressure of the flow of resin in the support portion 61 on the downstream side and contributes to attainment of the dimensional accuracy of the entire guide member.

The injection-molding gate mark 60*g* may be provided throughout the circumference of the outer face of the attachment portion 60. With this structure, because a film gate method can be employed in the molding step of the guide member 6, it is possible to suppress the radial shrinkage anisotropy of the resin after the molding. Therefore, as described above, it is possible to uniformly fill the resin into the circular cylindrical support portion 61. According to this molding, the attachment portion 60 and the support portion 61 are less likely to bend and become deformed, which contributes to attainment of the dimensional accuracy.

The attachment portion 60 has the board-shaped portion 60*b* that is in contact with and fitted in an inner face of the housing 2 and the annular protruding portion 60*a* that forms the clearance between its outer face and the inner face of the housing 2. The injection-molding gate mark 60*g* exposed to the clearance is provided to the outer face of the annular protruding portion 60*a*.

With this structure, because the board-shaped portion 60*b* is in contact with the housing 2, the guide member 6 can be positioned appropriately and fixed in the appropriate attitude with respect to the housing 2. Moreover, the injection-molding gate mark 60*g* provided to the outer face of the annular protruding portion 60*a* faces or is included in the clearance formed between the outer face of the annular protruding portion 60*a* and the inner face of the housing 2. In this manner, it is possible to provide the structure in which the mark of the gate portion 101 formed on the resin molded article does not obstruct fixing of the housing 2 and the guide member 6 to each other. As a result, the solenoid valve 1 contributes to attainment of appropriate positional accuracy and attitude of the guide member 6, which is the resin molded article, with respect to the housing 2. Moreover, additional processing after cutting the gate is unnecessary, which reduces cost of manufacturing and suppresses faulty assembly due to a gate burr.

The injection-molding gate mark 60*g* protrudes from the outer face of the annular protruding portion 60*a* and is housed in the above-described clearance. With this structure, the gate portion of the molding including the guide member 6 only has to be cut to have such a protruding dimension that the remaining gate portion can be housed in the clearance. In this way, high accuracy is not required of the protruding dimension of the injection-molding gate mark 60*g*, which greatly reduces the number of man-hours to cut the gate portion.

The housing 2 includes the end cylinder portion 2*a* having the first peripheral portion 2*a*2 and the second peripheral portion 2*a*3 that surround the attachment portion 60. The first peripheral portion 2*a*2 is positioned closer to the tip end than the second peripheral portion 2*a*3 and has the larger inside diameter than the second peripheral portion 2*a*3. The above-described clearance to which the injection-molding gate mark 60*g* is exposed is formed between the annular protruding portion 60*a* and the first peripheral portion 2*a*2.

The board-shaped portion 60b and the second peripheral portion 2a3 are in contact and fitted with each other.

With this structure, because the board-shaped portion 60b and the second peripheral portion 2a3 are in contact and fitted with each other, the guide member 6 can be positioned appropriately and fixed in the appropriate attitude with respect to the housing 2. Moreover, it is possible to process the injection-molding gate mark 60g provided to the annular protruding portion 60a while selecting the protruding height in such a range that the injection-molding gate mark 60g barely comes or does not come in contact with the first peripheral portion 2a2. As a result, it is possible to provide the solenoid valve 1 in which the mark of the gate portion 101 unavoidably formed on the guide member 6 as the resin molded article does not obstruct a fitted state of the board-shaped portion 60b and the second peripheral portion 2a3 with each other and the appropriate positional accuracy and attitude of the guide member 6 can be secured.

Second Embodiment

The second embodiment will be described with reference to FIGS. 6 to 8. In the second embodiment, component parts provided with the same reference signs as those in the drawings according to the first embodiment and structures which are not described are similar and have similar workings and effects to those in the first embodiment. In the second embodiment, only differences from the first embodiment will be described.

Figure 6:
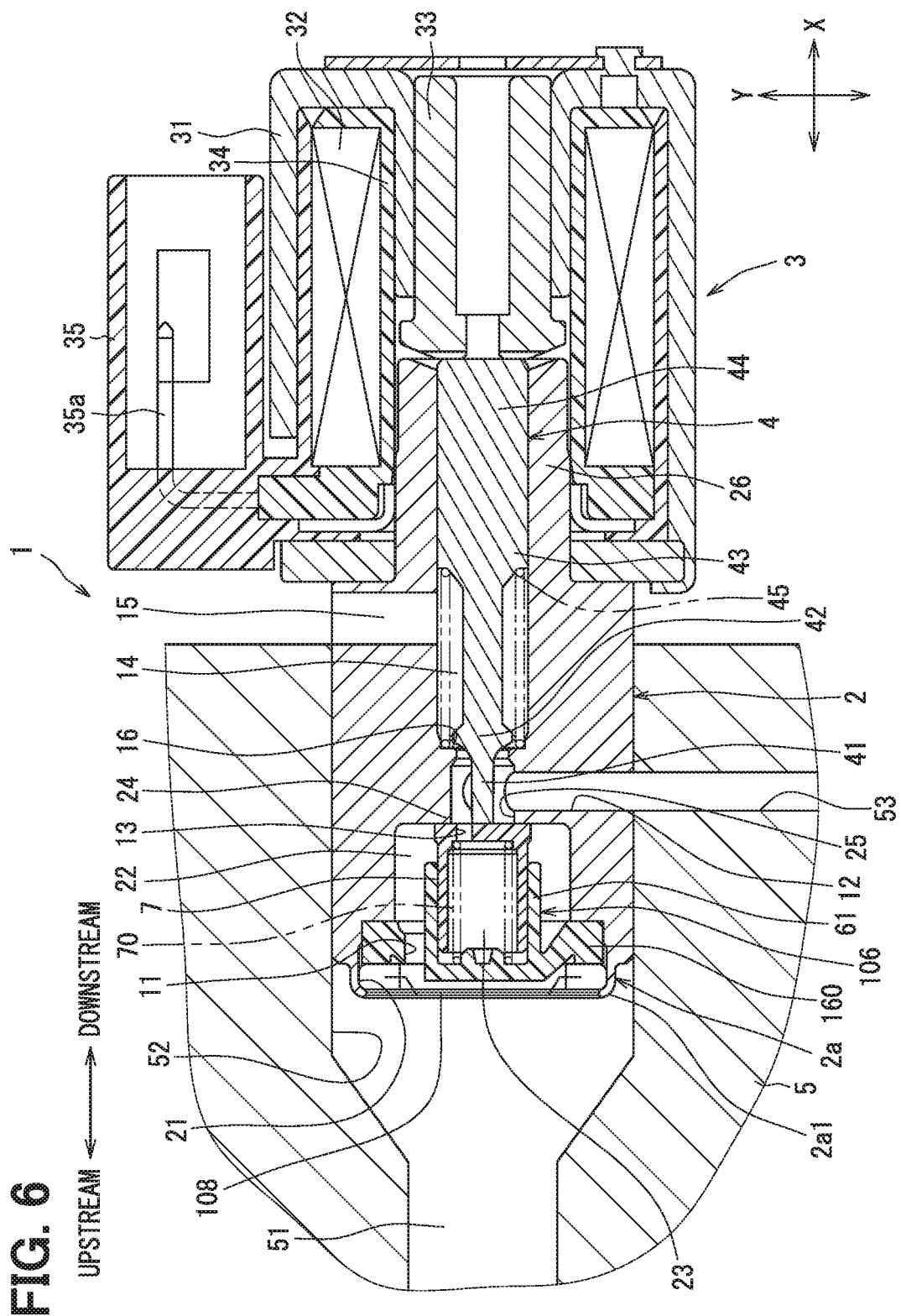
FIG. 6 is a sectional view of a solenoid valve according to a second embodiment.
Figure 7:
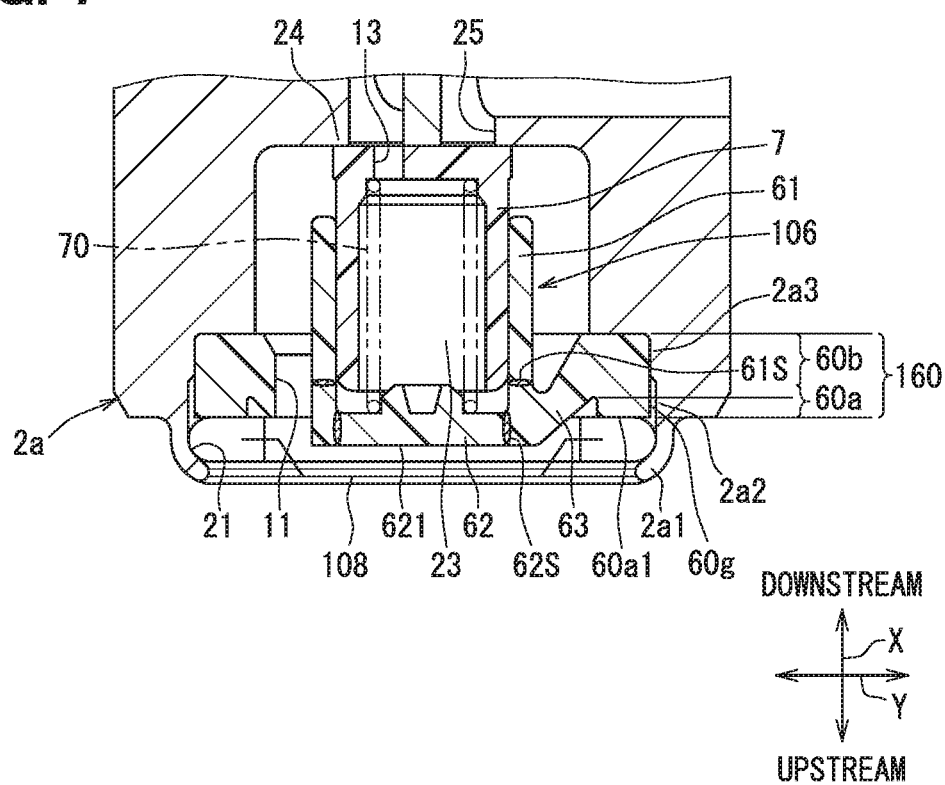
FIG. 7 is a partially sectional view of a guide member of the solenoid valve in the second embodiment.

As shown in FIGS. 6 and 7, a guide member 106 is a resin part integrally including a support portion 61, an attachment portion 160 mounted to an end cylinder portion 2a, an upstream board-shaped portion 62 positioned on an upstream side of the attachment portion 160, and connecting portions 63 that connect the attachment portion 160 and the upstream board-shaped portion 62. The guide member 106 is a resin molded article that is molded by filling resin material into a mold device similarly to the guide member 6. The guide member 106 is provided with injection-molding gate marks 60g similar to that on the guide member 6.

The upstream board-shaped portion 62 is integrally formed with an upstream end portion of the support portion 61. The upstream board-shaped portion 62 is an intermediate joint portion that connects the attachment portion 160 and the support portion 61 with the connecting portions 63 interposed therebetween. The attachment portion 160 has a larger shape in an orthogonal direction orthogonal to an axial direction of the guide member 106 than the upstream board-shaped portion 62. The support portion 61 has a shape extending in the axial direction from the upstream board-shaped portion 62. The upstream board-shaped portion 62 is provided coaxially with the support portion 61.

The attachment portion 160 is positioned on a downstream side of the upstream board-shaped portion 62 in the axial direction. The upstream board-shaped portion 62 which is the intermediate joint portion is provided on an upstream side of the attachment portion 160 in the axial direction. The attachment portion 160 is provided to surround the support portion 61. The attachment portion 160 is integrally connected to the upstream board-shaped portion 62 by the connecting portions 63 formed to extend toward the upstream side in the axial direction as they extend radially inward. Each of the connecting portions 63 is formed such that an outer edge portion connected to the attachment portion 160 is positioned on the downstream side of an inner edge portion connected to the upstream board-shaped portion 62 in the axial direction. Here, "the downstream side" can be translated into "a side of a valve port 25" or "a side of an electromagnetic solenoid portion 3".

Similarly to the attachment portion 60, the attachment portion 160 is a fixed portion that has an outer peripheral portion coming in contact with the end cylinder portion 2a from inside and is fixed to the end cylinder portion 2a by partial swaging of an inner wall of the end cylinder portion 2a. The attachment portion 160 includes a board-shaped portion 60b and an annular protruding portion 60a protruding toward the upstream side in an annular shape along a central axis of the guide member 106 from an outer peripheral edge of the board-shaped portion 60b. An upstream end face 60a1 of the annular protruding portion 60a is positioned on a downstream side of an upstream end face 621 of the upstream board-shaped portion 62. The upstream board-shaped portion 62 and the upstream end face 621 have shapes orthogonal to the central axis of the guide member 106.

The upstream end face 60a1 is in contact with a frame portion of a filter member 108. The annular protruding portion 60a and a tip end portion 2a1 of the end cylinder portion 2a pinch the frame portion of the filter member 108. A mesh portion of the filter member 108 is disposed on an upstream side of the frame portion that supports a peripheral edge portion of the mesh portion. The filter member 108 has such a shape that the mesh portion on an inner side is positioned on the upstream side of the frame portion that is the peripheral edge portion. The upstream end face 621 and the mesh portion of the filter member 108 are separate from each other in the axial direction.

Figure 8:
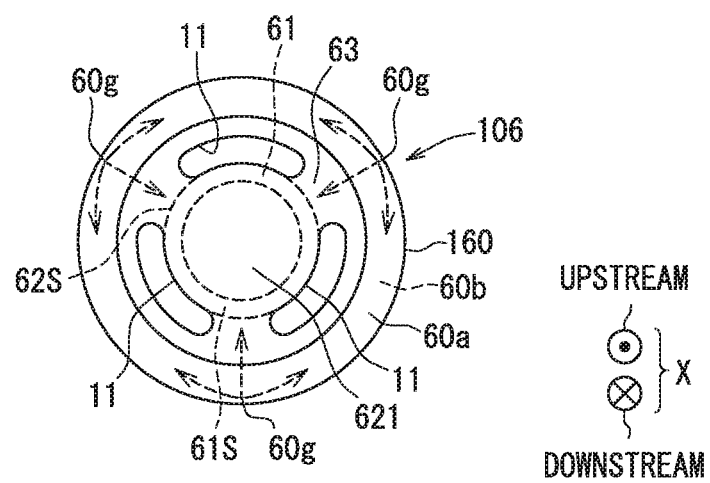
FIG. 8 is a plan view of an attachment portion and inlet passages of the guide member in the second embodiment in an axial direction.

As shown in FIGS. 7 and 8, resin portions between adjacent inlet passages 11 are the connecting portions 63 and the attachment portion 160 and the upstream board-shaped portion 62 are connected by the connecting portions 63. The connecting portions 63 are provided at equal intervals in a circumferential direction. The upstream board-shaped portion 62 has a portion connected to the upstream end portion of the support portion 61 on a radially inner side of the inlet passages 11, i.e., at a position closer to the central axis of the guide member 106 than the inlet passages 11.

As shown in FIG. 7, each of the connecting portions 63 extending from the attachment portion 160 to the upstream board-shaped portion 62 forms an obtuse angle with the upstream board-shaped portion 62 extending from the connecting portion 63 toward the central axis of the guide member 106. Each of the connecting portions 63 extending from the attachment portion 160 to the upstream board-shaped portion 62 forms an acute angle with the support portion 61 extending from the upstream board-shaped portion 62 toward the downstream side along the central axis. In other words, each of the connecting portions 63 has such an inclined shape with respect to the central axis of the guide member 106 that its upstream end portion is closer to the central axis than its downstream end portion. The support portion 61 has such a shape as to extend toward the downstream side along the central axis from a portion of the upstream board-shaped portion 62 connected to the upstream end portions of the connecting portions 63.

As shown in FIGS. 7 and 8, the connection portion where the upstream board-shaped portion 62 and the upstream end portion of the support portion 61 are connected to each other forms an annular face that is a face orthogonal to the central axis of the guide member 106 and has about the same width as a wall thickness of the support portion 61. An area of the annular face corresponds to an area of a cross sectional surface 61S of the support portion 61.

The upstream board-shaped portion 62 has such a structure that a cylindrical sectional surface 62S closer to a central axis of the upstream board-shaped portion 62 than the connection portion to the support portion 61 has a larger area than the cross sectional surface 61S. The cylindrical sectional surface 62S forms a section that is obtained by cutting the upstream board-shaped portion 62 into a cylindrical shape around the central axis of the guide member 106. The cylindrical sectional surface 62S is the section of the upstream board-shaped portion 62 positioned on the radially inner side of the inlet passages 11, i.e., closer to the central axis of the guide member 106 than the inlet passages 11 and on a radially inner side of the upstream end portion of the support portion 61. The cylindrical sectional surface 62S is a passage through which molten resin passes when flowing down from passages corresponding to the connecting portions 63 to the upstream board-shaped portion 62 in a mold in a molding step for manufacturing the guide member 106. The area of the cylindrical sectional surface 62S is a value obtained by a product of a circumferential length and an axial length of the cylindrical sectional surface 62S.

In the guide member 106 shown in FIG. 7, a vertical section of each of the connecting portions 63 extending from the attachment portion 160 to the upstream board-shaped portion 62 is connected to a vertical section of the support portion 61 extending toward the downstream side along a direction of the central axis and a vertical section of the upstream board-shaped portion 62 extending toward the central axis. The vertical sections mentioned here are sections along the central axis of the guide member 106.

With this structure, in the molding step, the molten resin flowing in from positions of an outer face of the attachment portion 160 corresponding to the injection-molding gate marks 60g flows through the attachment portion 160 and the connecting portions 63 in this order and then branches and flows down into the support portion 61 and the upstream board-shaped portion 62. At this time, the molten resin branching from the connecting portions 63 into the support portion 61 and the upstream board-shaped portion 62 is less likely to flow toward the support portion 61 and flows toward the upstream board-shaped portion 62 because the angle which the support portion 61 forms with the connecting portions 63 is the acute angle. Moreover, because the area of the cylindrical sectional surface 62S is larger than the area of the cross sectional surface 61S, the molten resin is likely to flow into the upstream board-shaped portion 62 with a smaller flow resistance. Therefore, the molten resin flows from the connecting portions 63 to fill the upstream board-shaped portion 62 first and then spreads into the guide member 106 in such a manner as to fill the support portion 61.

As shown by dotted-line arrows in FIG. 8, in the molding step, the molten resin flowing in from the respective injection-molding gate marks 60g flows toward the central axis of the guide member 106 through between the inlet passages 11 and also flows on an outer side of the inlet passages 11 while dividing in the circumferential direction. In this way, the molten resin flowing in from the injection-molding gate marks 60g can flow from the outer peripheral side toward the central axis while filling the attachment portion 160, reach the upstream board-shaped portion 62 through the connecting portions 63 to fill the upstream board-shaped portion 62 first, and then fill the support portion 61.

According to the solenoid valve 1 in the second embodiment, the guide member 106 includes the connecting portions 63 that connect the attachment portion 160 and the intermediate joint portion. The connecting portion 63 and the intermediate joint portion are provided to form the obtuse angle with each other and the connecting portion 63 and the support portion 61 are provided to form the acute angle with each other.

With this structure, in the mold, the passage from each of the connecting portions 63 to the intermediate joint portion has a shape closer to a straight line than the passage from each of the connecting portions 63 to the support portion 61 and therefore has the smaller passage resistance. As a result, the molten resin flowing in from the gates is likely to flow from the connecting portions 63 to the intermediate joint portion and less likely to flow to the support portion 61 in the molding step of the guide member 106. Therefore, the molten resin can fill the intermediate joint portion first and then flow down to fill the support portion 61 to spread in the guide member 106. In this way, it is possible to uniformly fill the resin material into the support portion of the guide member 106.

Moreover, the guide member 106 may have such a structure that the cylindrical sectional surface 62S of the intermediate joint portion closer to the central axis of the guide member 106 than the connection portion between the intermediate joint portion and the support portion 61 has the larger area than the cross sectional surface 61S of the support portion 61. With this structure, in the molding step of the guide member 106, the molten resin flowing in from the positions corresponding to the injection-molding gate marks 60g flows through the attachment portion 160, the connecting portions 63, and the intermediate joint portion in this order and then branches off from the intermediate joint portion and flows down into the support portion 61. At this time, because the molten resin flows smoothly from the connecting portions 63 into the intermediate joint portion with the small passage resistance, it is possible to form the flow of molten resin that fills the intermediate joint portion first and then fills the support portion 61. In the guide member 106, the resin material can be spread uniformly in the support portion 61, which contributes to enhancement of dimensional accuracy of the support portion 61.

Third Embodiment

Figure 9:
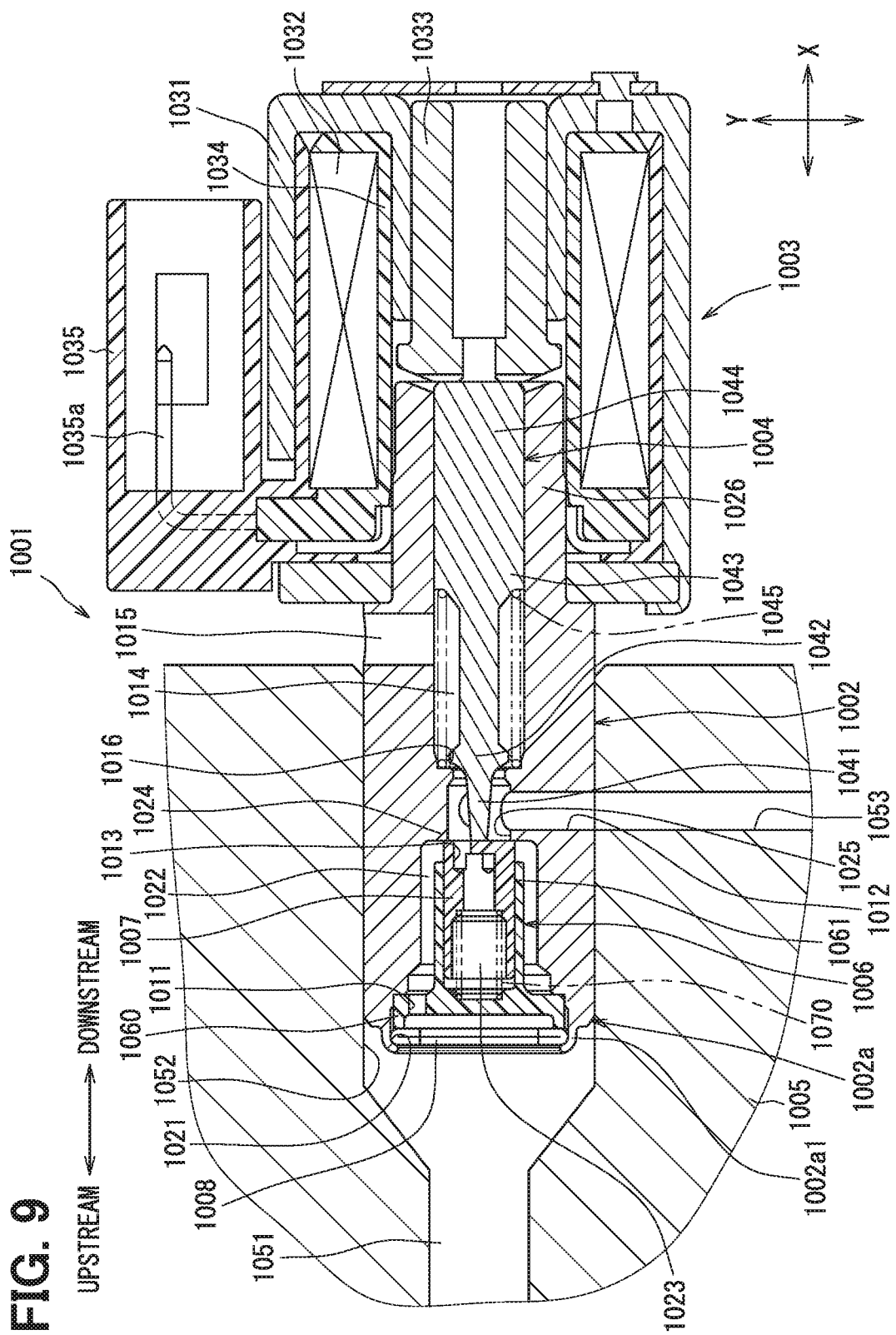
FIG. 9 is a sectional view of a structure of the solenoid valve common to the respective embodiments.

A solenoid valve 1001 in the third embodiment will be described with reference to FIGS. 9 to 12. FIG. 9 shows an overall schematic structure of the solenoid valve 1001 that is mounted to an automatic transmission system of an automobile, for example, and switches between oil paths in order to carry out transmission control. As shown in FIG. 9, the solenoid valve 1001 includes a flow path controller housed in a housing 1002 and an electromagnetic solenoid portion 1003 integrally connected to the flow path controller.

The flow path controller includes the cylindrical housing 1002 that has an end cylinder portion 1002a fitted in a mounting hole 1052 and extends in an axial direction of the mounting hole 1052, the mounting hole 1052 forming a circular columnar passage in an automatic transmission or a passage forming member 1005 on a side of the automatic transmission. An upstream passage 1051 as an oil inflow passage through which pressure-regulated oil (as an example of working fluid) flows is formed in the passage forming member 1005 and the upstream passage 1051 communicates with inlet passages 1011. The inlet passages 1011 are passages that allow the upstream passage 1051 and a valve chamber 1022 to communicate with each other.

Figure 10:
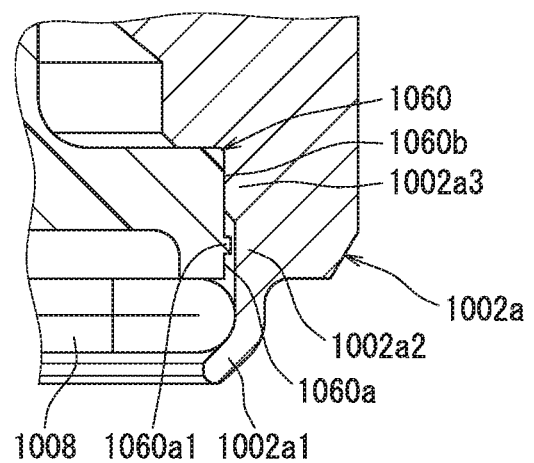
FIG. 10 is a partial sectional view of a structure related to fitting of an attachment portion and an end cylinder portion of a housing with each other in a solenoid valve in a third embodiment.

The housing 1002 has the end cylinder portion 1002a that is fitted in the mounting hole 1052 and a shaft retaining portion 1026 that is positioned on an opposite side from the end cylinder portion 1002a in the axial direction. As shown in FIG. 10, the end cylinder portion 1002a has a tip end portion 1002a1 in which an opening end is formed and a first peripheral portion 1002a2 and a second peripheral portion 1002a3 that surround an attachment portion 1060 of a guide member 1006. The first peripheral portion 1002a2 is positioned closer to the tip end portion 1002a1 than the second peripheral portion 1002a3. The first peripheral portion 1002a2 is a cylindrical portion having a larger inside diameter than the second peripheral portion 1002a3.

The shaft retaining portion 1026 retains a shaft 1004, such that the shaft 1004 can be displaced in the axial direction, and is mounted to the electromagnetic solenoid portion 1003 that is fitted onto the shaft retaining portion 1026. The solenoid valve 1001 is mounted to the automatic transmission by being fixed with the end cylinder portion 1002a of the housing 1002 fitted in the mounting hole 1052 in the passage forming member 1005 and an outflow port 1012 and a downstream passage 1053 connected to each other.

In the housing 1002, a filter chamber 1021 is provided at a position close to the tip end. The filter chamber 1021 is a chamber in the solenoid valve 1001 which the oil from the automatic transmission flows into first and a filter member 1008 that covers an entire cross section of the passage and filters the oil as the working fluid is mounted into the filter chamber 1021.

The valve chamber 1022 that communicates with downstream sides of the inlet passages 1011 is provided in the housing 1002 and a valve port 1025 is open in a downstream end portion of the valve chamber 1022. An inside discharge passage 1014 that communicates with an outside discharge passage 1015 is provided on a downstream side of the valve port 1025 in the housing 1002. Furthermore, the outflow port 1012 extending sideways to cross the axial direction between the valve port 1025 and the inside discharge passage 1014 is provided in the housing 1002. The outflow port 1012 is connected to the downstream passage 1053 as an oil outflow passage that is formed in the passage forming member 1005 and communicating with a valve of the transmission.

The filter member 1008 is a disc-shaped member that is positioned on a most upstream side of a flow of oil in the end cylinder portion 1002a. The filter member 1008 has a mesh portion disposed at a position facing upstream sides of the inlet passages 1011. The filter member 1008 has a frame portion provided throughout a circumference in such a manner as to surround a periphery of the mesh portion. For example, the mesh portion is formed by etching a central portion of a disc-shaped plate member. The remaining part of the plate member not subjected to the etching forms the frame portion formed at the periphery of the mesh portion. It is also possible to manufacture the filter member 1008 by bonding, welding, or the like of the mesh portion and the frame portion, which are separate members, to each other.

A valve seat 1024 with which a downstream end portion of a valve element 1007 can come in contact is provided to the housing 1002. The valve seat 1024 forms a peripheral edge portion of the valve port 1025 as a through hole passing through a central part of the valve chamber 1022 in the axial direction. The valve chamber 1022 includes a space positioned between the inlet passages 1011 and the valve port 1025 and houses a support portion 1061 of the guide member 1006 and the valve element 1007. The valve element 1007 is moved between an open state and a closed state of the valve port 1025 by operation of the solenoid valve 1001. The valve element 1007 is controlled to come into the open state where the working fluid is allowed to flow from the valve chamber 1022 into the downstream passage 1053 when the downstream end portion separates from the valve seat 1024 and the valve element 1007 is controlled to come into the closed state where the working fluid is prevented from flowing when the downstream end portion comes in contact with the valve seat 1024.

The valve element 1007 is a cylindrical body having a bottom portion positioned at the valve port 1025 in the closed state. In the valve element 1007, an upstream end portion on an opposite side from the bottom portion is open. A peripheral edge portion of the bottom portion is the downstream end portion. The bottom portion is provided with pressure release passages 1013 passing through a portion of the bottom portion excluding a central portion that comes in contact with the shaft 1004. The pressure release passages 1013 form passages for allowing the spring chamber 1023 that is an inner chamber of the cylindrical body, i.e., the valve element 1007 and the valve port 1025 to communicate with each other in the closed state.

The guide member 1006 is housed in the end cylinder portion 1002a. The guide member 1006 is a resin part integrally including the support portion 1061 that supports the valve element 1007 in such a manner as to allow the valve element 1007 to slide in the axial direction and the attachment portion 1060 protruding radially outward in a radial shape at an end portion on an upstream side of the support portion 1061. The guide member 1006 is a resin molded article that is molded by filling resin material into a mold device. The support portion 1061 is a cylindrical portion extending coaxially with the attachment portion 1060 from the attachment portion 1060 toward the valve port 1025 along the axial direction.

The attachment portion 1060 is a fixed portion that has an outer peripheral portion coming in contact with the end cylinder portion 1002a from inside and is fixed to the end cylinder portion 1002a by partial swaging of an inner wall of the end cylinder portion 1002a. Therefore, a plurality of swaged portions for fixing the attachment portion 1060 to the housing 1002 are provided to the inner wall of the end cylinder portion 1002a. The single or the plurality of inlet passage(s) 1011 passes/pass in the axial direction through a portion of the attachment portion 1060 closer to a center than the plurality of swaged portions.

As shown in FIG. 10, the attachment portion 1060 has a fitted portion 1060b that is in contact with and fitted in an inner face of the end cylinder portion 1002a and a non-fitted portion 1060a that forms a clearance between its outer face and the inner face of the end cylinder portion 1002a. The fitted portion 1060b and the second peripheral portion 1002a3 are in contact and fitted with each other throughout a circumference or at portions throughout the circumference. With this structure, the guide member 1006 is positioned appropriately and fixed in an appropriate attitude with respect to the housing 1002.

The outer face of the non-fitted portion 1060a is separate from the inner face of the first peripheral portion 1002a2 of the end cylinder portion 1002a, the inner face facing the outer face in the radial direction. "The outer face of the non-fitted portion 1060a" mentioned here can be translated into "the outer peripheral face of the non-fitted portion 1060a". The clearance is formed between the non-fitted portion 1060a and the first peripheral portion 1002a2. The clearance forms a cylindrical space formed outside the non-fitted portion 1060a or inside the first peripheral portion 1002a2. In the clearance, an injection-molding gate mark 1060a1 formed on the guide member 1006 is exposed. The injection-molding gate mark 1060a1 is provided to the attachment portion 1060 to be in a range of a radial length of the clearance. The injection-molding gate mark 1060a1 can be provided in the clearance to partially or entirely face or occupy the clearance.

The injection-molding gate mark 1060a1 is provided to the outer face of the non-fitted portion 1060a. The injection-molding gate mark 1060a1 is a portion left on the guide member 1006 as a mark of cutting of a gate portion 1101 off from a molding 1100 manufactured in molding the guide member 1006 by using resin. The injection-molding gate mark 1060a1 may be a protruding portion protruding from the outer face of the non-fitted portion 1060a or may be left as a cut mark not protruding from the outer face of the non-fitted portion 1060a depending on a method of cutting the gate portion 1101 and a cut position.

The injection-molding gate mark 1060a1 protrudes from the outer face of the non-fitted portion 1060a. The injection-molding gate mark 1060a1 is housed in the annular clearance formed between the outer face of the non-fitted portion 1060a and the inner face of the first peripheral portion 1002a2. The injection-molding gate mark 1060a1 may be separate from the inner face of the first peripheral portion 1002a2 or in contact with the inner face of the first peripheral portion 1002a2.

The injection-molding gate mark 1060a1 is provided at a predetermined position throughout the circumference of the outer face of the non-fitted portion 1060a. The plurality of injection-molding gate marks 1060a1 may be arranged at intervals throughout the circumference of the outer face of the non-fitted portion 1060a. The injection-molding gate mark 1060a1 may be provided throughout the circumference of the outer face of the non-fitted portion 1060a. In this structure, the injection-molding gate mark 1060a1 forms an annular protrusion portion extending throughout the circumference of the outer peripheral face of the non-fitted portion 1060a. The annular protrusion portion can be disposed in an area from a tip end portion of the non-fitted portion 1060a to an end portion of the non-fitted portion 1060a on a side of the fitted portion 1060b in the axial direction of the guide member 1006.

Figure 11:
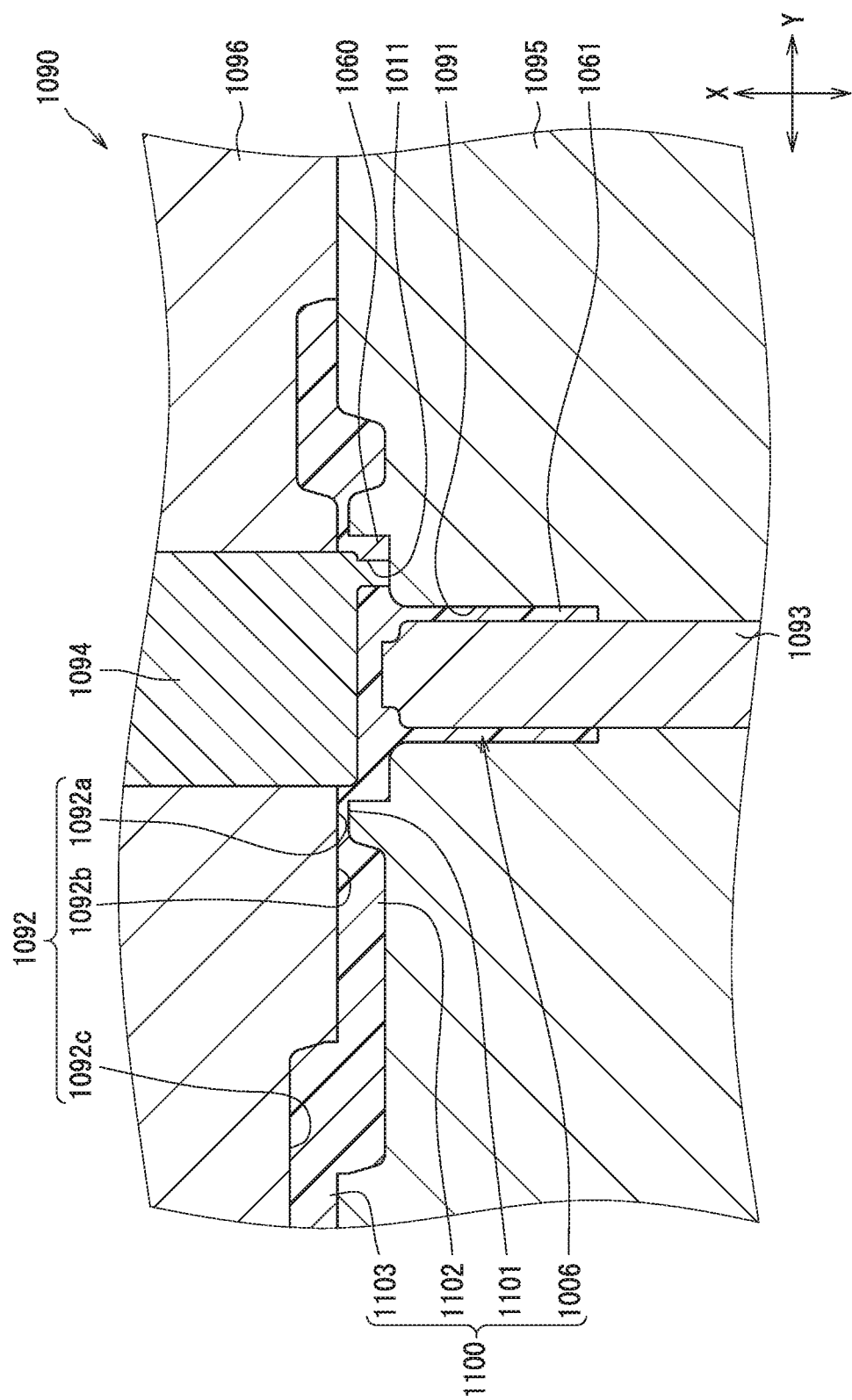
FIG. 11 is a vertical sectional view of a structure of a mold device.

Next, a method for manufacturing the guide member 1006 that is a resin molded article will be described. The guide member 1006 is molded by using a mold device 1090 such as a mold. First, the mold device 1090 will be described with reference to FIG. 11. As shown in FIG. 11, a cavity 1091 for molding the guide member 1006 and a resin passage 1092 for supplying the molten resin into the cavity 1091 are provided in the mold device 1090. The cavity 1091 forms an inner space having a similar shape to the guide member 1006.

The resin passage 1092 includes a sprue into which the molten resin is supplied from an injection molding machine, a gate 1092a for supplying the molten resin into the cavity 1091, and runners 1092b, 1092c connecting the sprue and the gate 1092a. The gate 1092a is a film gate. The gate 1092a is connected to an outer periphery of the cavity 1091 and extends in an annular shape along a circumferential direction of the cavity 1091. The gate 1092a is disposed at a portion of the cavity 1091 corresponding to an outer peripheral face of the attachment portion 1060 in a radial direction Y. The first runner 1092b is provided on an outer peripheral side of the gate 1092a, extends in an annular shape along a circumferential direction of the gate 1092a, and is connected to the gate 1092a. The second runner 1092c connects the first runner 1092b and the sprue while extending in the radial direction Y.

The mold device 1090 has a first pin-shaped mold portion 1093, a second pin-shaped mold portion 1094, a first mold portion 1095, and a second mold portion 1096. In the mold device 1090, these mold portions are assembled to form the cavity 1091, the gate 1092a, and the runners 1092b, 1092c. For the guide member 1006, the first mold portion 1095 molds at least the support portion 1061 and the second mold portion 1096 molds at least a tip end face of the attachment portion 1060. The first pin-shaped mold portion 1093 is mounted to the first mold portion 1095 by being inserted into an insertion hole provided in the first mold portion 1095 and molds an inner peripheral face of the support portion 1061. The second pin-shaped mold portion 1094 is mounted to the second mold portion 1096 by being inserted into an insertion hole provided in the second mold portion 1096 and molds inner peripheral faces of the inlet passages 1011.

To manufacture the guide member 1006, the mold device 1090 is prepared and then, a step of molding the molding 1100 is performed by use of the mold device 1090. In this step, the molten resin that is resin material mixed with glass fibers, for example, is injected from the injection molding machine into the sprue of the mold device 1090. The molten resin flows through the runner 1092c and the runner 1092b, flows into the cavity 1091 from the gate 1092a, reaches a portion of the cavity 1091 for molding the attachment portion 1060, and reaches a portion of the cavity 1091 for molding the support portion 1061 by moving in an axial direction X.

Because the gate 1092a and the portion of the cavity 1091 for molding the attachment portion 1060 are arranged in the radial direction Y, a direction in which the molten resin flows in the portion of the cavity 1091 for molding the attachment portion 1060 is likely to be uniformized into the radial direction Y. In this case, turbulence is less likely to be generated in the molten resin flowing through the portion of the cavity 1091 for molding the attachment portion 1060. As a result, when the molten resin solidifies to form the attachment portion 1060, shrinkage anisotropy of the molten resin is reduced, which makes the attachment portion 1060 less likely to bend and become deformed.

Because the gate 1092a has the annular shape as described above, the molten resin flowing through the portion of the cavity 1091 for molding the support portion 1061 is less likely to move in the circumferential direction of the cavity 1091 and is likely to move in the axial direction X. In other words, turbulence is less likely to be generated in the molten resin flowing through a portion of the cavity 1091 for molding the inner peripheral face and the like of the support portion 1061. As a result, when the molten resin solidifies to form the support portion 1061, shrinkage anisotropy of the molten resin is reduced, which makes the support portion 1061 less likely to bend and become deformed.

Moreover, because the gate 1092a has the annular shape, it is unlikely that flows of molten resin in opposite directions meet in the circumferential direction of the cavity 1091. As a result, when the molten resin solidifies to mold the support portion 1061, a weld that is a meeting portion of the flows of molten resin is less likely to be generated. During the injection of the molten resin into the mold device 1090, the first pin-shaped mold portion 1093 performs gas release from the cavity 1091 in such a manner as to release gas from an opposite side from the gate 1092a in the axial direction X of the cavity 1091.

Figure 12:
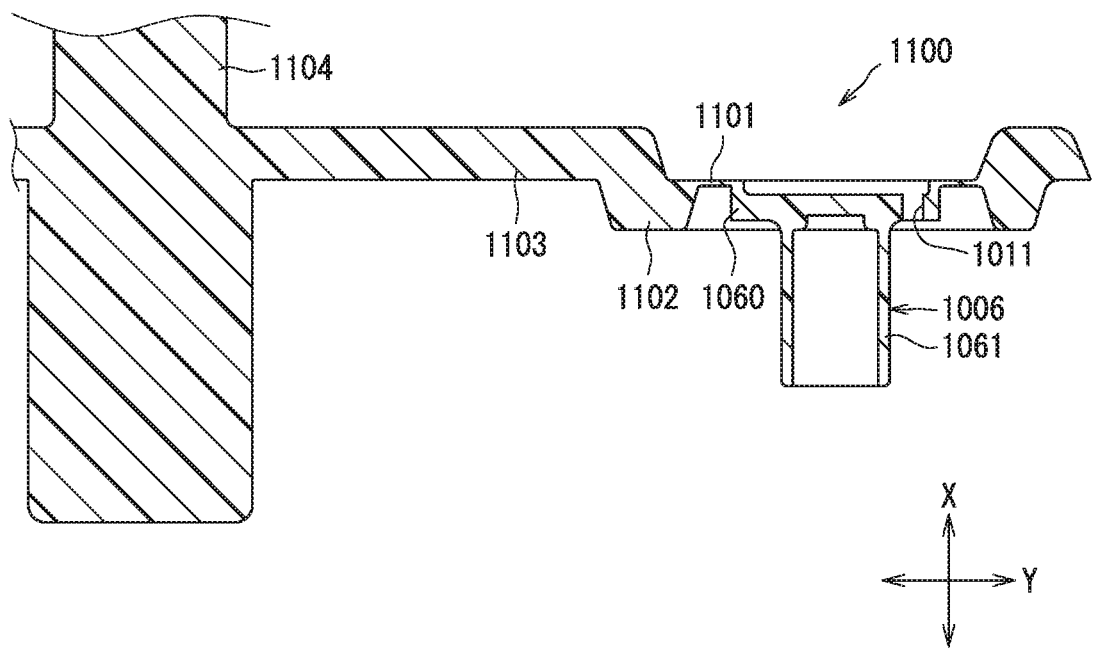
FIG. 12 is a vertical sectional view of a molding.

Next, after solidifying the molten resin, the mold device 1090 is detached from the molding 1100 that is the solidified molten resin. As shown in FIG. 12, the molding 1100 includes the guide member 1006, a gate portion 1101 molded by the gate 1092a, a first runner portion 1102 and a second runner portion 1103 molded by the runners 1092b, 1092c, and a sprue portion 1104 molded by the sprue, which are integral with each other. The gate portion 1101 extends radially outward in a radial shape from the outer peripheral face of the attachment portion 1060 and extends in an annular shape in a circumferential direction of the valve element 1007. The first runner portion 1102 extends radially outward from the gate portion 1101 and extends in an annular shape in a circumferential direction of the gate portion 1101. In this case, the gate portion 1101 is disposed between the guide member 1006 and the first runner portion 1102 in the radial direction Y of the guide member 1006. The second runner portion 1103 connects the first runner portion 1102 and the sprue portion 1104.

Next, for the molding 1100, a step of detaching the guide member 1006 from the first runner portion 1102 is performed. In this step, the gate portion 1101 is cut by use of a laser output from a laser irradiation device, for example. The laser irradiation device outputs the laser such that the laser extends in the axial direction X of the guide member 1006 and the laser is applied to a position of the gate portion 1101 separate radially outward from the attachment portion 1060 and separate radially inward from the first runner portion 1102. After the gate portion 1101 is cut, a portion of the gate portion 1101 remaining on the side of the guide member 1006 is the injection-molding gate mark 1060a1.

The filter member 1008 is fixed integrally with the attachment portion 1060 of the guide member 1006 by the plurality of swaged portions, for example. The plurality of swaged portions are arranged at equal intervals in the circumferential direction at the periphery of the mesh portion. The plurality of swaged portions are provided to the tip end portion 1002a1 of the end cylinder portion 1002a. Alternatively, the plurality of swaged portions may be a plurality of protruding portions protruding from an end face of the attachment portion 1060 in contact with the frame portion, arranged in the circumferential direction, and deformed by swaging. In this case, the filter member 1008 and the attachment portion 1060 are integrated with each other, with the plurality of protruding portions passing through hole portions formed in the frame portion, and disposed inside the end cylinder portion 1002a. The attachment portion 1060 has the plurality of swaged portions arranged at the intervals around the central axis of the guide member 1006.

The support portion 1061 of the guide member 1006 supports a cylinder wall portion of the valve element 1007 coaxial with the support portion 1061 and in contact with the support portion 1061 from inside. The cylindrical valve element 1007 can slide in the axial direction with respect to the support portion 1061 while an inner wall face of the support portion 1061 and the outer wall face of the cylinder wall portion of the valve element 1007 are in contact with each other. Furthermore, the valve element 1007 receives a spring force in the axial direction from a spring 1070, which is an example of a biasing member, and is pushed toward the valve port 1025. The spring 1070 is disposed between the attachment portion 1060 and a stepped portion formed on the cylinder wall portion of the valve element 1007.

In the open state where the valve element 1007 is separate from the valve seat 1024, the working fluid after passing through the upstream passage 1051 passes through the inlet passages 1011 and flows into the valve chamber 1022. At this time, a pressure in the valve chamber 1022 is increased by an inflow of the working fluid. As a result, a fluid pressure in the valve chamber 1022 acts on the valve element 1007 and therefore the fluid pressure acts on the spring chamber 1023 inside the valve element 1007 as well. The pressure acting on the spring chamber 1023 acts on a side face of the cylinder wall portion 1072 of the valve element in the valve chamber 1022 and acts on the spring chamber 1023 via a sliding portion sliding on the support portion 1061. Therefore, the guide member 1006 guides the valve element 1007, which receives the spring force of the spring 1070, a force applied by the shaft 1004, and the fluid pressure, in reciprocating in the axial direction. Because the valve element 1007 has the pressure release passages 1013 passing through a bottom portion 1071, the pressure acting on the spring chamber 1023, i.e., the inside chamber of the cylindrical body is released to the downstream passage 1053 via the pressure release passages 1013, which suppresses the internal pressure in the inside chamber of the cylindrical body. In this way, even if a high fluid pressure acts on the valve chamber 1022, it is possible to suppress a pressure that the valve element 1007 receives in the axial direction.

The valve element 1007 is displaced in the axial direction by a pressing force of the shaft 1004 caused to operate in the axial direction by the electromagnetic solenoid portion 1003 and switched between the closed state where the valve element 1007 is seated on the valve seat 1024 around the valve port 1025 and the open state where the valve element 1007 is separate from the valve seat 1024. In the closed state, the outflow port 1012 and the upstream passage 1051 are disconnected from each other and a tapered valve portion 1042 of the shaft 1004 separates from a periphery of a discharge valve port 1016 to open the inside discharge passage 1014 to thereby connect the downstream passage 1053 and the outside discharge passage 1015. In the open state, the outflow port 1012 and the upstream passage 1051 are connected to each other and the valve portion 1042 is seated on the periphery of the discharge valve port 1016 to close the inside discharge passage 1014 to thereby disconnect the downstream passage 1053 and the outside discharge passage 1015 from each other.

The electromagnetic solenoid portion 1003 disposed on a side of a rear end of the housing 1002 includes a yoke 1031, a bobbin 1034, a coil 1032, a movable member 1033, a shaft 1004, a spring 1045, a connector 1035, and the like. The bobbin 1034 is formed in a substantially circular cylindrical shape by use of resin material and provided in the yoke 1031. The coil 1032 is wound around an outer peripheral face of the bobbin 1034. The yoke 1031 is made of magnetic material. The yoke 1031 is provided coaxially with the bobbin 1034 in such a manner as to support an inner peripheral side of the bobbin 1034 and cover an outer peripheral side of the coil 1032. The bobbin 1034 is provided coaxially with the housing 1002 while housing, inside itself, a portion of the housing 1002 supporting the shaft 1004 such that the shaft 1004 can slide. The yoke 1031, the movable member 1033, the shaft 1004, and the like are provided coaxially with the housing 1002 similarly to the bobbin 1034.

The movable member 1033 is formed in a circular cylindrical shape by use of magnetic material. The movable member 1033 is supported by the yoke 1031 in such a manner as to be able to reciprocate in the axial direction. In the electromagnetic solenoid portion 1003, a magnetic circuit is formed by the movable member 1033 and the yoke 1031.

A large diameter portion 1044 of the shaft 1004 is fixed to an end face of a bottom portion of the movable member 1033 to be coaxial with the movable member 1033. The shaft 1004 and the movable member 1033 can integrally reciprocate in the axial direction. The shaft 1004 integrally includes a tip end portion 1041 positioned concentrically with the valve port 1025 and having a small diameter, the valve portion 1042 positioned in the inside discharge passage 1014, and the large diameter portion 1044 fitted in the shaft retaining portion 1026 to be able to slide with a stepped portion 1043 interposed therebetween. The inside discharge passage 1014 is connected to the outside discharge passage 1015 formed on the side of the rear end of the housing 1002. The outside discharge passage 1015 is a passage forming a drain port and provided to the housing 1002 on a tip end side of the shaft retaining portion 1026 to extend in a direction orthogonal to the inside discharge passage 1014.

Between the stepped portion 1043 and a peripheral edge of the discharge valve port 1016, the spring 1045 as an example of a biasing member is disposed. The spring 1045 constantly applies a biasing force for pushing the shaft 1004 toward the movable member 1033. The valve element 1007 disposed in the valve chamber 1022 is constantly pushed toward the valve port 1025 by the spring 1070. In this way, when the electromagnetic solenoid portion 1003 is not energized, the shaft 1004 is biased by the spring force of the spring 1045 and the valve element 1007 is pushed toward the valve port 1025 by the spring force of the spring 1070. As a result, the valve portion 1042 opens the discharge valve port 1016 and the downstream end portion of the valve element 1007 closes the valve port 1025.

The connector 1035 is integrally molded with a cover of the coil 1032 and provided to be positioned beside the yoke 1031. The connector 1035 is provided to energize the coil 1032 and a terminal 1035*a* in the connector 1035 is electrically connected to the coil 1032. In the electromagnetic solenoid portion 1003, it is possible to control a current passing through the coil 1032 by electrically connecting the terminal 1035*a* to a current controller or the like by use of the connector 1035.

When the coil 1032 of the electromagnetic solenoid portion 1003 is not energized, the shaft 1004 is biased in such a direction as to separate from the valve element 1007 by the spring force of the spring 1045 and the valve element 1007 is pushed toward the valve port 1025 by the spring 1070. As a result, the valve element 1007 closes the valve port 1025. Moreover, the valve portion 1042 of the shaft 1004 opens the discharge valve port 1016. In this state, the upstream passage 1051 and the downstream passage 1053 are disconnected from each other and the oil from the downstream passage 1053 passes through the outflow port 1012 and the inside discharge passage 1014 and is discharged outside from the outside discharge passage 1015.

If the coil 1032 is energized in this state, a magnetic flux is generated in the magnetic circuit formed by the yoke 1031 and the movable member 1033 and the movable member 1033 is axially attracted toward the tip end side of the housing 1002 and moves toward the tip end side against the biasing force of the spring 1045 to thereby move the shaft 1004. At this time, the valve portion 1042 closes the discharge valve port 1016 and the valve element 1007 is pushed toward the upstream side by the shaft 1004 to thereby move toward the tip end side to open the valve port 1025. In this state, the upstream passage 1051 and the downstream passage 1053 are connected to each other and the oil from the upstream passage 1051 passes through the inlet passage 1011, the valve chamber 1022, the valve port 1025, and the outflow port 1012 and flows into the downstream passage 1053. In this manner, by turning on/off the current passing through the coil 1032, it is possible to perform an ON/OFF control of a pressure of control fluid in the oil outflow passage. In this way, it is possible to control the pressure, a flow rate, and the like of the control fluid used for controlling an object to be controlled.

Next, workings and effects of the solenoid valve 1001 in the third embodiment will be described. The solenoid valve 1001 includes: the housing 1002 having, inside itself, the valve chamber 1022 into which the working fluid flows; the valve element 1007 that is provided in the valve chamber 1022 and opens and closes the valve port 1025 between the open state and the closed state; and the electromagnetic solenoid portion 1003 that generates a drive force for displacing the valve element 1007 in the axial direction. The solenoid valve 1001 further includes the guide member 1006 that is the resin molded article. The guide member 1006 is provided in the valve chamber 1022 and has the support portion 1061 and the attachment portion 1060 mounted while in contact with the housing 1002 from inside, the support portion 1061 supporting the valve element 1007 such that the valve element 1007 can slide in the axial direction. The attachment portion 1060 has the fitted portion 1060*b* that is in contact with and fitted in an inner face of the housing 1002 and the non-fitted portion 1060*a* that forms the clearance between its outer face and the inner face of the housing 1002. The injection-molding gate mark 1060*a*1 exposed to the clearance is provided to the outer face of the non-fitted portion 1060*a*.

With this structure, because the fitted portion 1060*b* is in contact with the housing 1002, the guide member 1006 can be positioned appropriately and fixed in the appropriate attitude with respect to the housing 1002. Moreover, the injection-molding gate mark 1060*a*1 provided to the outer face of the non-fitted portion 1060*a* faces or is included in the clearance formed between the outer face of the non-fitted portion 1060*a* and the inner face of the housing 1002. In this manner, it is possible to provide the structure in which the mark of the gate portion 1101 formed on the resin molded article does not obstruct fixing of the housing 1002 and the guide member 1006 to each other. As a result, the solenoid valve 1001 contributes to attainment of appropriate positional accuracy and attitude of the guide member 1006, which is the resin molded article, with respect to the housing 1002. Moreover, according to the solenoid valve 1001 in the third embodiment, additional processing after cutting the gate is unnecessary, which reduces cost of manufacturing and suppresses faulty assembly due to a gate burr.

The injection-molding gate mark 1060*a*1 protrudes from the outer face of the non-fitted portion 1060*a* and is housed in the above-described clearance. With this structure, the gate portion of the molding including the guide member 1006 only has to be cut to have such a protruding dimension that the remaining gate portion can be housed in the clearance. In this way, high accuracy is not required of the protruding dimension of the injection-molding gate mark 1060*a*1, which greatly reduces the number of man-hours to cut the gate portion.

The injection-molding gate mark 1060*a*1 may be provided throughout the circumference of the outer face of the non-fitted portion 1060*a*. With this structure, because a film gate method can be employed in the molding step of the guide member 1006, it is possible to suppress the radial shrinkage anisotropy of the resin after the molding. Therefore, as described above, it is possible to uniformly fill the resin into the circular cylindrical support portion 1061. According to this molding, the fitted portion 1060*b* and the support portion 1061 are less likely to bend and become deformed, which contributes to attainment of the dimensional accuracy.

The housing 1002 includes the end cylinder portion 1002a having the first peripheral portion 1002a2 and the second peripheral portion 1002a3 that surround the attachment portion 1060. The first peripheral portion 1002a2 is positioned closer to the tip end than the second peripheral portion 1002a3 and has the larger inside diameter than the second peripheral portion 1002a3. The above-described clearance to which the injection-molding gate mark 1060a1 is exposed is formed between the non-fitted portion 1060a and the first peripheral portion 1002a2. The fitted portion 1060b and the second peripheral portion 1002a3 are in contact and fitted with each other.

With this structure, because the fitted portion 1060b and the second peripheral portion 1002a3 are in contact and fitted with each other, the guide member 1006 can be positioned appropriately and fixed in the appropriate attitude with respect to the housing 1002. Moreover, it is possible to process the injection-molding gate mark 1060a1 provided to the non-fitted portion 1060a while selecting the protruding height in such a range that the injection-molding gate mark 1060a1 barely comes or does not come in contact with the first peripheral portion 1002a2. As a result, it is possible to provide the solenoid valve 1001 in which the mark of the gate portion 1101 unavoidably formed on the guide member 1006 as the resin molded article does not obstruct a fitted state of the fitted portion 1060b and the second peripheral portion 1002a3 with each other and the appropriate positional accuracy and attitude of the guide member 1006 can be secured.

Fourth Embodiment

The fourth embodiment will be described with reference to FIG. 13. In the fourth embodiment, component parts provided with the same reference signs as those in the drawings according to the third embodiment and structures which are not described are similar and have similar workings and effects to those in the third embodiment. In the fourth embodiment, only differences from the third embodiment will be described.

Figure 13:
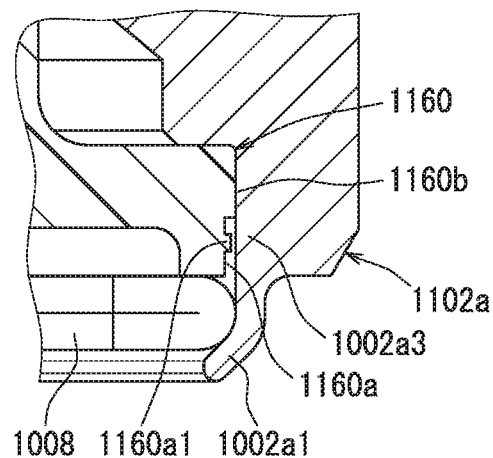
FIG. 13 is a partial sectional view of a structure related to fitting of an attachment portion and an end cylinder portion of a housing with each other in a solenoid valve in a fourth embodiment.

As shown in FIG. 13, an end cylinder portion 1102a has a tip end portion 1002a1 and a second peripheral portion 1002a3 as a peripheral portion that surrounds an attachment portion 1060 of a guide member 1006. The second peripheral portion 1002a3 in the fourth embodiment has an end portion separate from a non-fitted portion 1160a and a portion on a downstream side or on a side of a valve element and in contact and fitted with a fitted portion 1160b. The second peripheral portion 1002a3 is formed such that both of the portions have the same inside diameters.

The attachment portion 1160 has the fitted portion 1160b that is in contact with and fitted in an inner face of an end cylinder portion 1102a and the non-fitted portion 1160a that forms a clearance between its outer face and the inner face of the end cylinder portion 1102a. The fitted portion 1160b and the second peripheral portion 1002a3 are in contact and fitted with each other throughout a circumference or at portions throughout the circumference. In this way, the guide member 1006 is positioned appropriately and fixed in an appropriate attitude with respect to a housing 1002.

The clearance is formed between the non-fitted portion 1160a and the second peripheral portion 1002a3. The clearance forms a cylindrical space formed outside the non-fitted portion 1160a or inside the second peripheral portion 1002a3. In the clearance, an injection-molding gate mark 1160a1 formed on the guide member 1006 is exposed. The injection-molding gate mark 1160a1 is provided to the non-fitted portion 1160a to be in a range of a radial length of the clearance. The injection-molding gate mark 1160a1 can be provided in the clearance to partially or entirely face or occupy the clearance.

The injection-molding gate mark 1160a1 is a mark of cutting of a gate portion 1101 off from a molding 1100 manufactured in molding the guide member 1006 by using resin similarly to the injection-molding gate mark 1060a1 in the above-described third embodiment. The injection-molding gate mark 1160a1 protrudes from the outer face of the non-fitted portion 1160a. "The outer face of the non-fitted portion 1160a" mentioned here can be translated into "the outer peripheral face of the non-fitted portion 1160a". The injection-molding gate mark 1160a1 is housed in the annular clearance formed between the outer face of the non-fitted portion 1160a and the inner face of the second peripheral portion 1002a3. The injection-molding gate mark 1160a1 may be separate from the inner face of the second peripheral portion 1002a3 or in contact with the inner face of the second peripheral portion 1002a3.

The injection-molding gate mark 1160a1 is provided at a predetermined position throughout the circumference of the outer face of the non-fitted portion 1160a. The plurality of injection-molding gate marks 1160a1 may be arranged at intervals throughout the circumference of the outer face of the non-fitted portion 1160a. The injection-molding gate mark 1160a1 may be provided throughout the circumference of the outer face of the non-fitted portion 1160a. In this structure, the injection-molding gate mark 1160a1 forms an annular protrusion portion extending throughout the circumference of the outer peripheral face of the non-fitted portion 1160a. The annular protrusion portion can be disposed in an area from a tip end portion of the non-fitted portion 1160a to an end portion of the non-fitted portion 1160a on a side of the fitted portion 1160b in an axial direction of the guide member 1006.

According to the solenoid valve 1001 in the fourth embodiment, the housing includes the end cylinder portion 1102a having the peripheral portion that surrounds the attachment portion 1160. The non-fitted portion 1160a is positioned closer to a tip end than the fitted portion 1160b and has a smaller outside diameter than the fitted portion 1160b. The peripheral portion and the fitted portion 1160b are in contact and fitted with each other. The clearance is formed between an end portion of the peripheral portion and the non-fitted portion 1160a. In the clearance, the injection-molding gate mark 1160a1 is exposed or housed.

With this structure, because the fitted portion 1160b and the peripheral portion are in contact and fitted with each other, the guide member 1006 can be positioned appropriately and fixed in the appropriate attitude with respect to the housing 1002. Moreover, it is possible to process the injection-molding gate mark 1160a1 provided to the non-fitted portion 1160a while selecting a protruding height in such a range that the injection-molding gate mark 1160a1 barely comes or does not come in contact with the end portion of the peripheral portion. As a result, it is possible to provide the solenoid valve 1001 in which the mark of the gate portion 1101 unavoidably formed on the guide member 1006 as a resin molded article does not obstruct a fitted state of the fitted portion 1160b and the peripheral portion with each other and the appropriate positional accuracy and attitude of the guide member 1006 can be secured. Moreover, according to the solenoid valve 1001 in the fourth embodiment, additional processing after cutting the gate is unnecessary, which reduces cost of manufacturing and suppresses faulty assembly due to a gate burr.

Fifth Embodiment

The fifth embodiment will be described with reference to FIG. 14. In the fifth embodiment, component parts provided with the same reference signs as those in the drawings according to the third embodiment and structures which are not described are similar and have similar workings and effects to those in the third embodiment. In the fifth embodiment, only differences from the third embodiment will be described.

Figure 14:
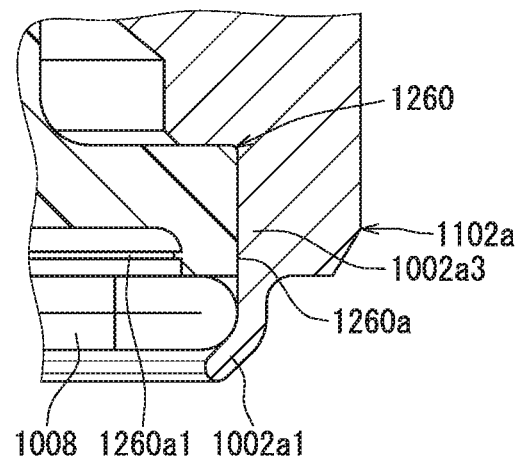
FIG. 14 is a partial sectional view of a structure related to fitting of an attachment portion and an end cylinder portion of a housing with each other in a solenoid valve in a fifth embodiment.

As shown in FIG. 14, the solenoid valve 1001 in the fifth embodiment is different from that in the third embodiment in a structure related to mounting of an attachment portion 1260 and an end cylinder portion 1102a to each other and a position of an injection-molding gate mark 1260a1. The attachment portion 1260 is in contact and fitted with the end cylinder portion 1102a throughout an axial length of its outer peripheral face. Therefore, the cylindrical attachment portion 1260 includes a fitted portion 1260a throughout its axial length. A guide member 1006 in the fifth embodiment includes the injection-molding gate mark 1260a1 formed on an inner peripheral face of the cylindrical attachment portion 1260. The injection-molding gate mark 1260a1 can be provided partially in a circumferential direction or throughout a circumference of the inner peripheral face of the attachment portion 1260.

According to the solenoid valve 1001 in the fifth embodiment, the injection-molding gate mark 1260a1 is provided on the inner peripheral face of the cylindrical attachment portion 1260. With this structure, because the guide member 1006 is in contact with a housing 1002 throughout an axial direction of an outer peripheral face of the attachment portion 1260, the guide member 1006 can be positioned appropriately and fixed in an appropriate attitude with respect to the housing 1002. Moreover, because the injection-molding gate mark 1260a1 is provided on the inner peripheral face of the cylindrical attachment portion 1260, it is possible to provide the structure in which the mark of a gate portion 1101 formed on a resin molded article does not obstruct fixing of the housing 1002 and the guide member 1006 to each other. Furthermore, according to the solenoid valve 1001 in the fifth embodiment, additional processing after cutting the gate is unnecessary, which reduces cost of manufacturing and suppresses faulty assembly due to a gate burr.

The disclosure of the description is not restricted to the embodiments shown as examples. The disclosure includes the embodiments shown as the examples and modifications made to the embodiments by a person skilled in the art. For example, the disclosure is not restricted to the combinations of parts and components shown in the embodiments and may be carried out while modified in various ways. The disclosure can be carried out by means of various combinations. The disclosure may include additional portions that can be added to the embodiments. The disclosure includes the embodiments from which the parts and the components are omitted. The disclosure includes exchange of the parts and the components between one and the others of the embodiments or combinations of the parts and the components in the embodiments. The disclosed technical scope is not restricted to the description of the embodiments. It should be understood that the disclosed technical scope is defined in claims and includes meanings equivalent to the claims and all modifications in the scope of the claims.

The injection-molding gate mark provided to the solenoid valve that can achieve the objective disclosed in the description is not restricted to such an injection-molding gate mark that the gate portion before cutting is formed by the film gate method. The injection-molding gate mark may be such injection-molding gate marks that gate portions before cutting are formed by a method in which molten resin flows into an attachment portion 60 through a plurality of gates disposed at intervals, i.e., what is called a multiple gate method.

Although the non-fitted portion is provided closer to the tip end than the fitted portion in the attachment portion in the first and second embodiments, the disclosure is not restricted to this. The fitted portion may be provided closer to the tip end than the non-fitted portion in the attachment portion.

In the above-described embodiments, the inlet passages 11 are passages passing through the board-shaped portion of the guide member in the axial direction and provided on the inner side of the end cylinder portion 2a. The inlet passages 11 are not restricted to these inlet passages 11 and may be formed by passages that pass through the end cylinder portion 2a in a radial direction to connect an outside and the valve chamber 22, for example.

Although the valve element 7 can slide in the axial direction with respect to the guide member 6 while in contact with the support portion 61 of the guide member 6 from inside in the above-described embodiments, the valve element 7 may be a structure that slides with respect to the guide member 6 while in contact with the support portion 61 of the guide member 6 from outside.

Besides the oil, other high-viscosity liquids may be used as the working fluid flowing through the solenoid valve 1 in the above-described embodiments.

The injection-molding gate mark provided to the solenoid valve that can achieve the objective disclosed in the description is not restricted to such an injection-molding gate mark that the gate portion before cutting is formed by the film gate method. The injection-molding gate mark may be such injection-molding gate marks that gate portions before cutting are formed by a method in which molten resin flows into an attachment portion 1060 through a plurality of gates disposed at intervals, i.e., what is called a multiple gate method.

Although the non-fitted portion is provided closer to the tip end than the fitted portion in the attachment portion in the third and fourth embodiments, the disclosure is not restricted to this. The fitted portion may be provided closer to the tip end than the non-fitted portion in the attachment portion.

In the above-described embodiments, the inlet passages 1011 are passages passing through the attachment portion 1060 of the guide member 1006 in the axial direction and provided on the inner side of the end cylinder portion 1002a. The inlet passages 1011 are not restricted to these inlet passages 1011 and may be formed by passages that pass through the end cylinder portion 1002a in a radial direction to connect an outside and the valve chamber 1022, for example.

Although the valve element 1007 can slide in the axial direction with respect to the guide member 1006 while in contact with the support portion 1061 of the guide member 1006 from inside in the above-described embodiments, the valve element 1007 may be a structure that slides with respect to the guide member 1006 while in contact with the support portion 1061 of the guide member 1006 from outside.

Besides the oil, other high-viscosity liquids may be used as the working fluid flowing through the solenoid valve 1001 in the above-described embodiments.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements.

In addition, while the various elements of the disclosure are shown in various combinations and configurations, which are exemplary, other various combinations and configurations, including more, less or only a single element, are also within the spirit of the disclosure.

What is claimed is:

1. A solenoid valve comprising:
a housing having therein a valve chamber into which working fluid flows;
a valve element slidable in the valve chamber to open and close a valve port for switching between an open state allowing a flow of the working fluid from the valve chamber to a downstream passage and a closed state preventing the flow of the working fluid from the valve chamber to the downstream passage; and
a guide member being a resin molded article provided in the valve chamber and including a support portion supporting the valve element to be slidable in an axial direction, and an attachment portion attached to and in contact with an inner side of the housing,
wherein:
the guide member further includes an intermediate joint portion connecting the attachment portion and the support portion;
the attachment portion has a larger shape in a direction orthogonal to the axial direction than the intermediate joint portion;
the support portion has a shape extending in the axial direction from the intermediate joint portion;
the guide member has an injection-molding gate mark on an outer face of the attachment portion;
the guide member includes a connecting portion that connects the attachment portion and the intermediate joint portion;
the connecting portion and the intermediate joint portion form an obtuse angle therebetween; and
the connecting portion and the support portion form an acute angle therebetween.

2. The solenoid valve according to claim 1, wherein the guide member has a structure in which a cylindrical sectional surface of the intermediate joint portion has a larger area than a cross sectional surface of the support portion, the cylindrical sectional surface being obtained by cutting the intermediate joint portion along a cylindrical surface around a central axis of the guide member, the cylindrical surface being closer to the central axis of the guide member or closer to an outer face of the attachment portion than a connection portion at which the intermediate joint portion and the support portion are joined.

3. The solenoid valve according to claim 1, wherein the guide member has a structure in which a cylindrical sectional surface of the intermediate joint portion has a larger area than a cross sectional surface of the support portion, the cylindrical sectional surface being obtained by cutting the intermediate joint portion along a cylindrical surface around a central axis of the guide member, the cylindrical surface being closer to the central axis of the guide member than a connection portion at which the intermediate joint portion and the support portion are joined.

4. The solenoid valve according to claim 1, wherein the injection-molding gate mark is provided at a position of the attachment portion closer to an upstream end face than to a downstream end face.

5. The solenoid valve according to claim 1, wherein the injection-molding gate mark is provided throughout the circumference of the outer face of the attachment portion.

6. The solenoid valve according to claim 1, further comprising an electromagnetic solenoid portion configured to generate a drive force for displacing the valve element in the axial direction.

7. A solenoid valve comprising:
a housing having therein a valve chamber into which working fluid flows;
a valve element slidable in the valve chamber to open and close a valve port for switching between an open state allowing a flow of the working fluid from the valve chamber to a downstream passage and a closed state preventing the flow of the working fluid from the valve chamber to the downstream passage; and
a guide member being a resin molded article provided in the valve chamber and including a support portion supporting the valve element to be slidable in an axial direction, and an attachment portion attached to and in contact with an inner side of the housing,
wherein:
the attachment portion includes a fitted portion that is in contact with and fitted in an inner face of the housing, and a non-fitted portion having an outer face separated by a clearance from the inner face of the housing; and
the guide member has an injection-molding gate mark exposed to the clearance on the outer face of the non-fitted portion.

8. The solenoid valve according to claim 7, wherein the injection-molding gate mark protrudes from the outer face of the non-fitted portion and is housed in the clearance.

9. The solenoid valve according to claim 7, wherein the injection-molding gate mark is provided throughout the circumference of the outer face of the non-fitted portion.

10. The solenoid valve according to claim 7, wherein
the housing includes an end cylinder portion having a first peripheral portion and a second peripheral portion that surround the attachment portion,
the first peripheral portion is positioned closer to an end of the end cylinder portion than the second peripheral portion, and has a larger inside diameter than the second peripheral portion,
the clearance to which the injection-molding gate mark is exposed is between the non-fitted portion and the first peripheral portion, and
the fitted portion and the second peripheral portion are in contact and fitted with each other.

11. The solenoid valve according to claim 7, wherein
the housing includes an end cylinder portion having a peripheral portion that surrounds the attachment portion,
the non-fitted portion is positioned closer to an end of the attachment portion than the fitted portion, and has a smaller outside diameter than the fitted portion,
the peripheral portion and the fitted portion are in contact and fitted with each other, and
the clearance is between an end portion of the peripheral portion and the non-fitted portion.

* * * * *